United States Patent
Park et al.

(10) Patent No.: US 11,509,358 B2
(45) Date of Patent: Nov. 22, 2022

(54) METHOD FOR RECEIVING REFERENCE SIGNAL IN WIRELESS COMMUNICATION SYSTEM AND APPARATUS THEREFOR

(71) Applicant: LG ELECTRONICS INC., Seoul (KR)

(72) Inventors: Jonghyun Park, Seoul (KR); Kijun Kim, Seoul (KR); Eunsun Kim, Seoul (KR); Hyunsoo Ko, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 137 days.

(21) Appl. No.: 17/140,607

(22) Filed: Jan. 4, 2021

(65) Prior Publication Data

US 2021/0126677 A1  Apr. 29, 2021

Related U.S. Application Data

(63) Continuation of application No. 16/064,290, filed as application No. PCT/KR2018/000169 on Jan. 4, 2018, now Pat. No. 10,944,450.

(60) Provisional application No. 62/566,516, filed on Oct. 1, 2017, provisional application No. 62/555,698, filed on Sep. 8, 2017, provisional application No. 62/501,114, filed on May 4, 2017, provisional
(Continued)

(51) Int. Cl.
*H04B 7/0408* (2017.01)
*H04L 5/00* (2006.01)
*H04L 27/26* (2006.01)
*H04B 7/0413* (2017.01)

(52) U.S. Cl.
CPC ......... *H04B 7/0408* (2013.01); *H04L 5/0053* (2013.01); *H04L 27/2613* (2013.01); *H04B 7/0413* (2013.01)

(58) Field of Classification Search
CPC .. H04B 7/0408; H04B 7/0413; H04B 7/0617; H04L 5/0053; H04L 27/2613; H04L 27/262; H04L 27/26134; H04L 27/26136
See application file for complete search history.

(56) References Cited

U.S. PATENT DOCUMENTS 9,520,973 B2   12/2016  Kim et al.
2012/0287875 A1  11/2012  Kim et al.
(Continued)

FOREIGN PATENT DOCUMENTS

KR   1020140058356   5/2014
KR   1020140116704   10/2014
(Continued)

OTHER PUBLICATIONS

Ericsson, "Design of Discovery Bursts and Procedures," 'R1-141642', 3GPP TSG RAN WG1 Meeting #76bis, Shenzhen, China, Mar. 31-Apr. 4, 2014, 8 pages.
(Continued)

*Primary Examiner* — Ian N Moore
*Assistant Examiner* — Latresa A McCallum
(74) *Attorney, Agent, or Firm* — Fish & Richardson P.C.

(57) ABSTRACT

Disclosed is a method for receiving a channel state information (CSI)-reference signal (RS) by a user equipment (UE) in a wireless communication system, which includes: receiving a CSI-RS associated with the SSB, in which the CSI-RS may be assumed to be quasi co-located (QCL) with the SSB.

20 Claims, 17 Drawing Sheets

Related U.S. Application Data application No. 62/444,316, filed on Jan. 9, 2017, provisional application No. 62/442,995, filed on Jan. 6, 2017.

(56) References Cited

U.S. PATENT DOCUMENTS

| | | |
|---|---|---|
| 2014/0198763 A1 | 7/2014 | Sorrentino et al. |
| 2015/0124688 A1 | 5/2015 | Xu et al. |
| 2015/0349855 A1 | 12/2015 | Sesia et al. |
| 2015/0349940 A1 | 12/2015 | Kim et al. |
| 2016/0006547 A1 | 1/2016 | Kang et al. |
| 2017/0331645 A1* | 11/2017 | Baugh ............ H04L 27/2613 |
| 2019/0166615 A1 | 5/2019 | Nimbalker et al. |
| 2020/0053738 A1 | 2/2020 | Harada et al. |

FOREIGN PATENT DOCUMENTS

| | | |
|---|---|---|
| KR | 1020150035556 | 4/2015 |
| KR | 1020160012129 | 2/2016 |
| KR | 1020160060654 | 5/2016 |
| WO | WO2015047141 | 4/2015 |
| WO | WO2016021993 | 2/2016 |

OTHER PUBLICATIONS

Intel Corporation, "Multi-carrier QCL for NR," R1-1611978, 3GPP TSG RAN WG1 Meeting #87, Reno, USA Nov. 14-18, 2016, 2 pages.

Intel Corporation, "On the spatial parameters for QCL," R1-1611979, 3GPP TSG RAN WG1 Meeting #87, Reno, USA Nov. 14-18, 2016, 3 pages.

Japanese Office Action in Japanese Appln. No. 2019-537164, dated Sep. 1, 2020, 5 pages (with English translation).

NTT Docomo, Inc., "Workplan for Study on NR Access Technology," 'R1-1612706', 3GPP TSG RAN WG1 Meeting #87, Reno, USA Nov. 14-18, 2016, 78 pages.

PCT International Search Report in International Appln. No. PCT/KR2018/000169, dated Jan. 4, 2018, 7 pages (with English translation).

\* cited by examiner

METHOD FOR RECEIVING REFERENCE SIGNAL IN WIRELESS COMMUNICATION SYSTEM AND APPARATUS THEREFOR

CROSS-REFERENCE TO RELATED APPLICATION

This application is a continuation of U.S. application Ser. No. 16/064,290, filed on Jan. 8, 2019, which is a National Stage filing under 35 U.S.C. 371 of International Application No. PCT/KR2018/000169, filed on Jan. 4, 2018, which claims the benefit of U.S. Provisional Application No. 62/442,995, filed on Jan. 6, 2017, U.S. Provisional Application No. 62/444,316, filed on Jan. 9, 2017, U.S. Provisional Application No. 62/501,114, filed on May 4, 2017, U.S. Provisional Application No. 62/555,698, filed on Sep. 8, 2017, and U.S. Provisional Application No. 62/566,516, filed on Oct. 1, 2017.

The contents of which are all hereby incorporated by reference herein in their entirety.

TECHNICAL FIELD

The present invention relates to wireless communications, and more particularly, to a method for receiving a reference signal of a user equipment based on QCL assumption and an apparatus for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present invention is to improve a reception performance of a reference signal of a terminal through Quasi-co-Location (QCL) assumption in a wireless communication system.

Furthermore, an object of the present invention is to define a QCL assumption operation for beam management in a wireless communication system.

The technical objects to attain in the present invention are not limited to the above-described technical objects and other technical objects which are not described herein will become apparent to those skilled in the art from the following description.

A method for receiving a channel state information (CSI)-reference signal (RS) by a user equipment (UE) in a wireless communication system according to an embodiment of the present invention includes: receiving a CSI-RS associated with the SSB, in which the CSI-RS may be assumed to be quasi co-located (QCL) with the SSB.

Furthermore, the SSB may include a primary synchronization signal/sequence (PSS), the SSS, and/or a physical broadcast channel (PBCH).

Furthermore, in the method for receiving the CSI-RS by the UE, the method may further include receiving QCL information for indicating the QCL assumption between the CSI-RS and the SSB, in which the QCL information may indicate an index of the SSB and a QCL type for a QCL parameter set to which the QCL assumption is applied.

Furthermore, the QCL information may be received through radio resource control (RRC) signaling.

Furthermore, the QCL type may be defined to indicate different QCL parameter sets for each QCL type.

Furthermore, the QCL parameter set may include a delay spread, a Doppler spread, a Doppler shift, an average gain, an average delay, and/or a spatial reception parameter.

Furthermore, the spatial reception parameter may include a receiving beam direction parameter and/or a receiving beam width related parameter.

Furthermore, the QCL type indicated for the QCL assumption with the SSB may be restricted to a specific QCL type in advance.

Furthermore, a QCL parameter set indicated by the specific QCL type may include the average delay, the Doppler shift, and/or the spatial reception parameter.

Furthermore, when the CSI-RS is mapped to a plurality of CSI-RS resources, application of the QCL assumption may be selectively indicated in units of each CSI-RS resource.

Furthermore, the indication for the application is received through the RRC signaling.

Furthermore, when the QCL assumption corresponds to a partial QCL assumption, it may be assumed that the QCL parameter of the CSI-RS corresponds to a sub-set of a QCL parameter derived from the SSB.

Furthermore, the CSI-RS may correspond to a periodic CSI-RS or aperiodic CSI-RS.

Furthermore, the CSI-RS may be a CSI-RS transmitted for a purpose of beam management.

Furthermore, a user equipment (UE) for receiving a channel state information (CSI)-reference signal (RS) in a wireless communication system according to another embodiment of the present invention includes: a radio frequency (RF) unit transmitting and receiving a radio signal; and a processor controlling the RF unit, in which the processor may receive a synchronization signal/sequence block (SSB) and a CSI-RS associated with the SSB by controlling the RF unit, and the CSI-RS may be assumed to be quasi co-located (QCL) with the SSB.

According to an embodiment of the present invention, a parameter in relation to a reception beam is defined as a new QCL parameter; there is an effect that a reception performance is more improved in a spatial aspect of an RS of a user equipment.

In addition, according to an embodiment of the present invention, since GCL assumption for different types of RSs is available, which brings the same effect as a density of a specific RS is increased, and accordingly, there is an effect that a reception performance of the corresponding RS is improved.

In addition, according to an embodiment of the present invention, since QCL signaling is indicated to a user equipment in a hierarchical signaling scheme, there is an effect that semi-static QCL indication considering an instantaneous situation is available as well as signaling overhead may be reduced.

Further, according to an embodiment of the present invention, since a CSI-RS is received based on the QCL assumption with an SSB, reception performance of the CSI-RS is enhanced. Moreover, when the QCL assumption is received for receiving the CSI-RS for the beam management, a QCL assumption operation for the beam management may be supported and more efficient beam management is available.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

MODE FOR INVENTION

Figures 1A, 1B:
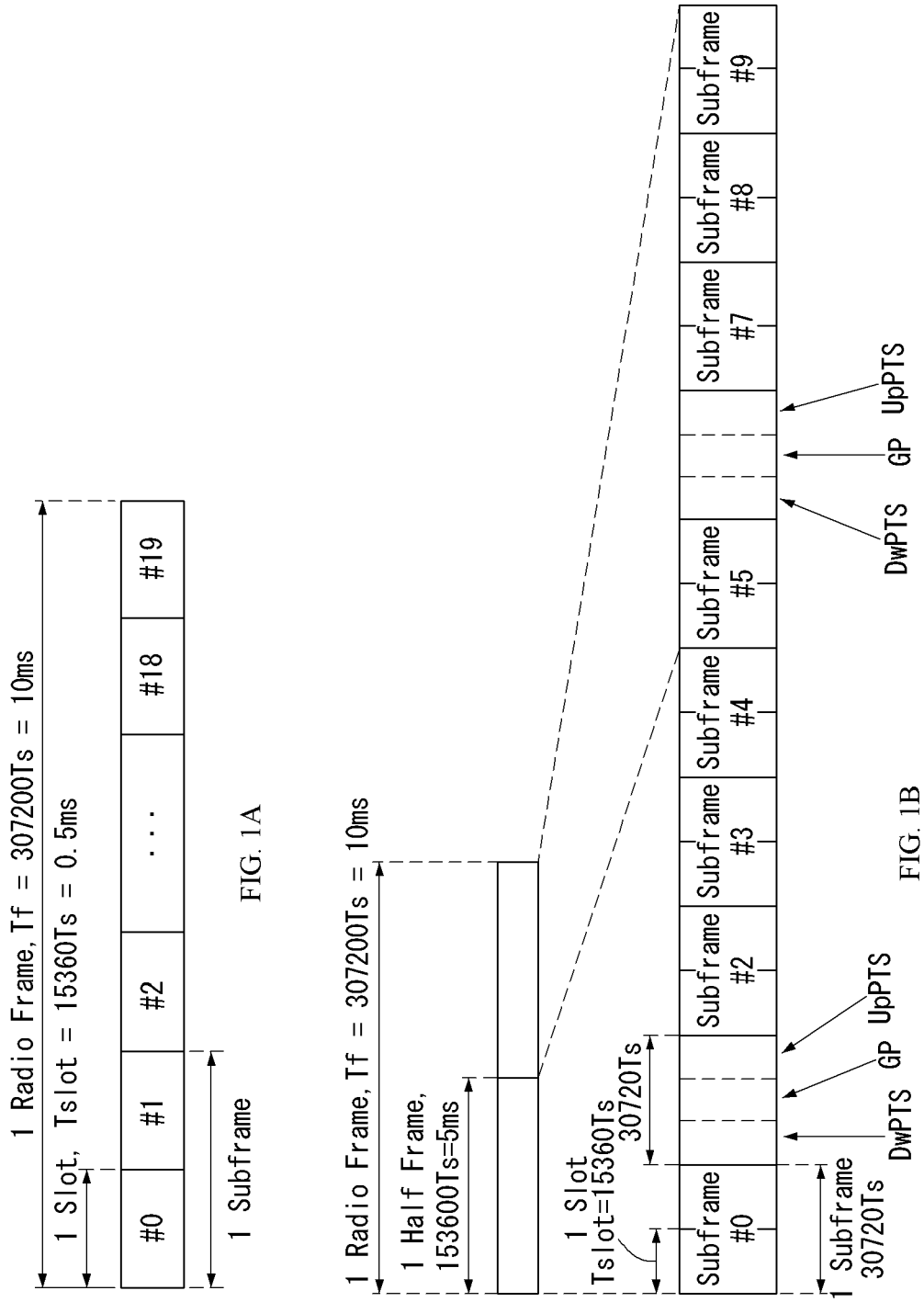
FIGS. 1A and 1B show the structures of a radio frame in a wireless communication system to which an embodiment of the present invention may be applied.

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), g-NodeB (gNB), New RAT (NR) or 5G-NodeB. Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIGS. 1A and 1B show the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1A illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

Figure 2:
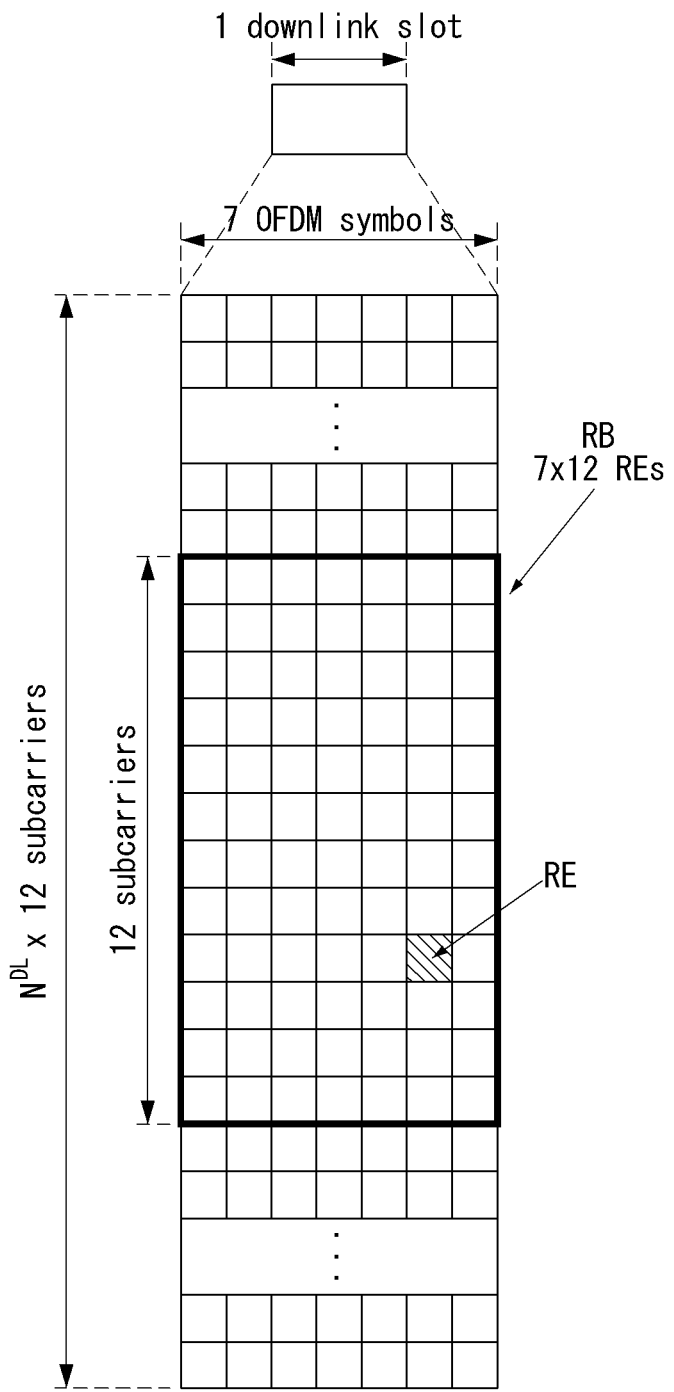
FIG. 2 is a diagram illustrating a resource grid for one downlink slot in a wireless communication system to which an embodiment of the present invention may be applied.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

Figure 3:
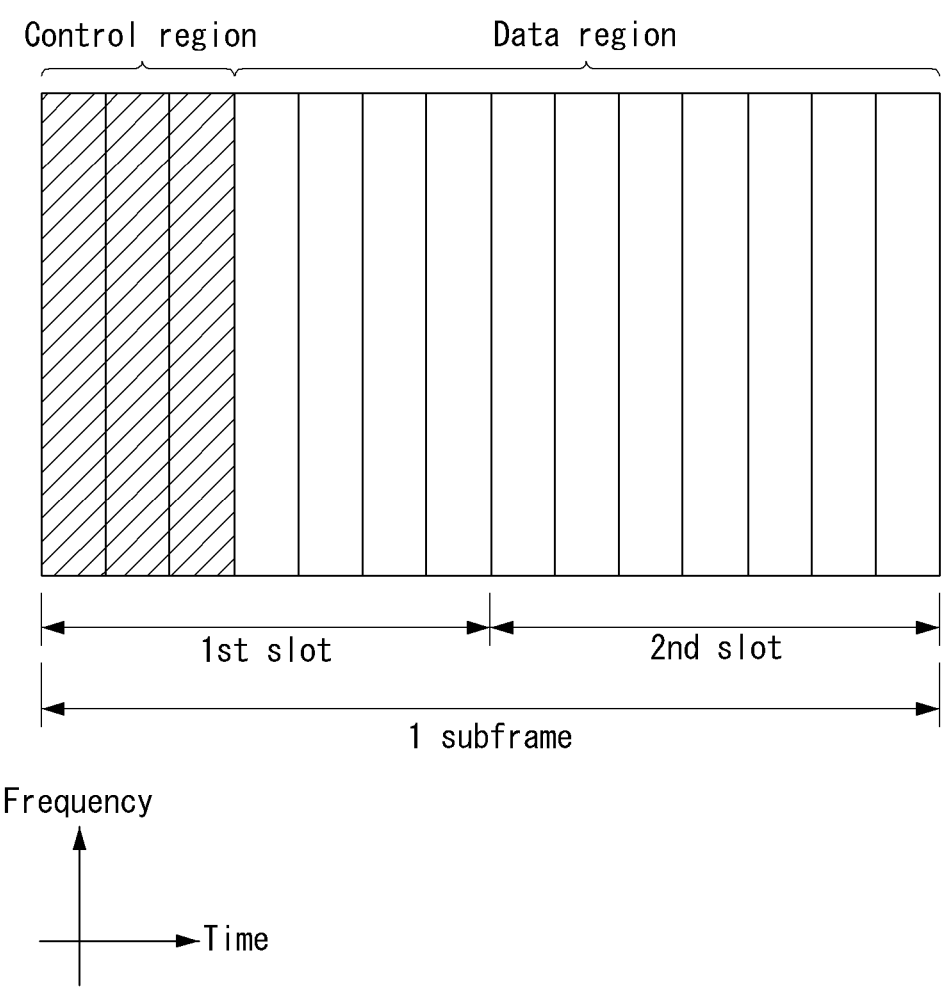
FIG. 3 shows the structure of a downlink subframe in a wireless communication system to which an embodiment of the present invention may be applied.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

Figure 4:
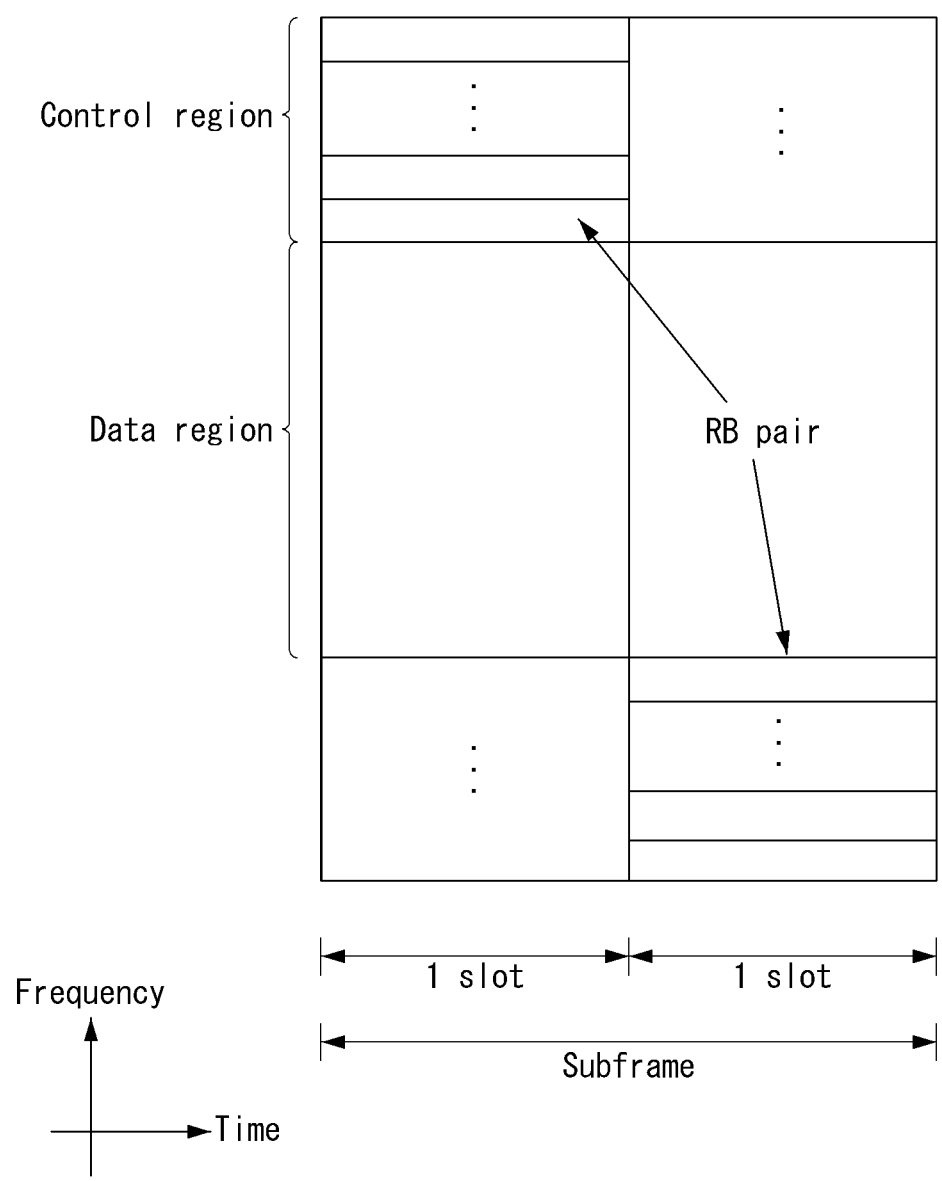
FIG. 4 shows the structure of an uplink subframe in a wireless communication system to which an embodiment of the present invention may be applied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is referred to as 'new RAT (NR)'.

Self-Contained Subframe Structure

Figure 5:
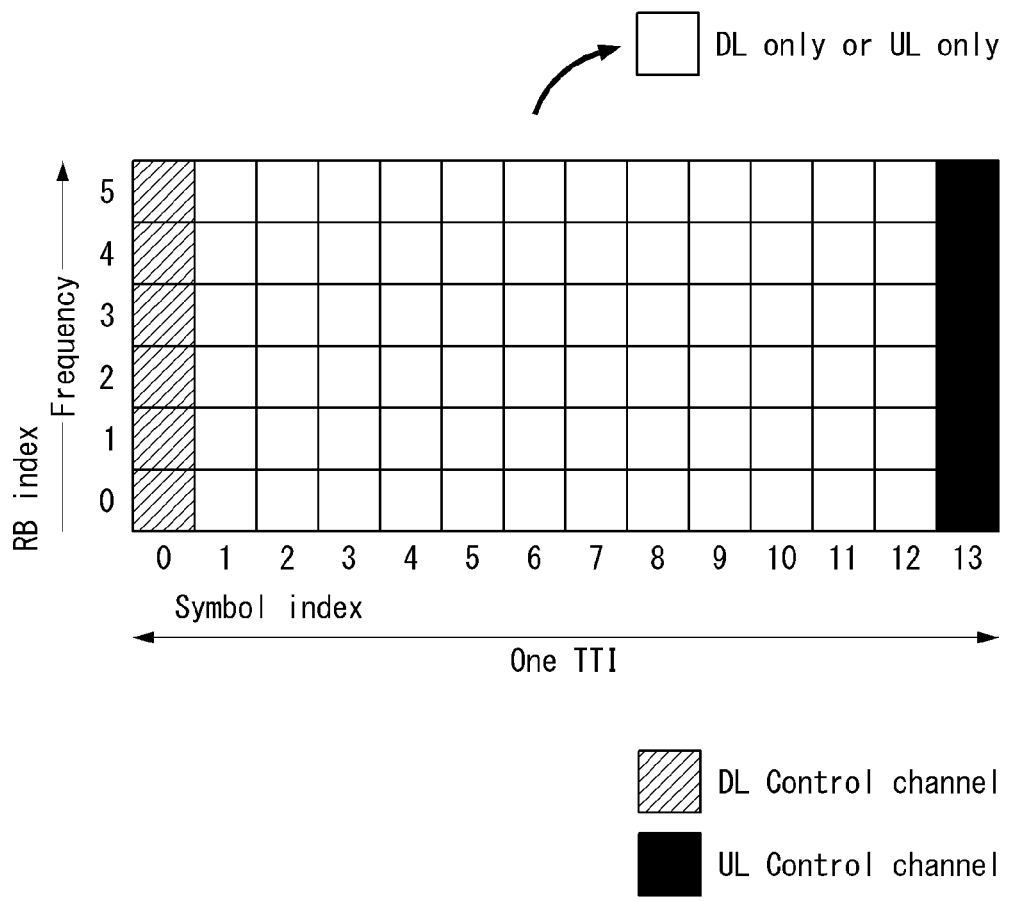
FIG. 5 illustrates a self-contained subframe structure to which the present invention may be applied.

FIG. 5 illustrates a self-contained subframe structure to which the present invention may be applied.

In TDD system, in order to minimize data transmission delay, the self-contained subframe structure as shown in FIG. 5 has been considered in 5 Generation new RAT. The shaded area in FIG. 5 shows a downlink control region, and the dark area shows an uplink control region. In addition, the area not marked in FIG. 5 may be used for a downlink (DL) data transmission or an uplink (UL) data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the delay till the last data forwarding may be minimized.

As an example of the self-contained subframe structure which may be configured/setup in a system operating based on New RAT, the following at least four subframe types may be considered. Hereinafter, the durations existed in each of the subframe types are numerated in time sequence.

1) DL control duration+DL data duration+guard period (GP)+UL control duration
2) DL control duration+DL data duration
3) DL data duration+GP+UL control duration+UL control duration
4) DL data duration+GP+UL control duration In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF'.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 100 antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

Figure 6:
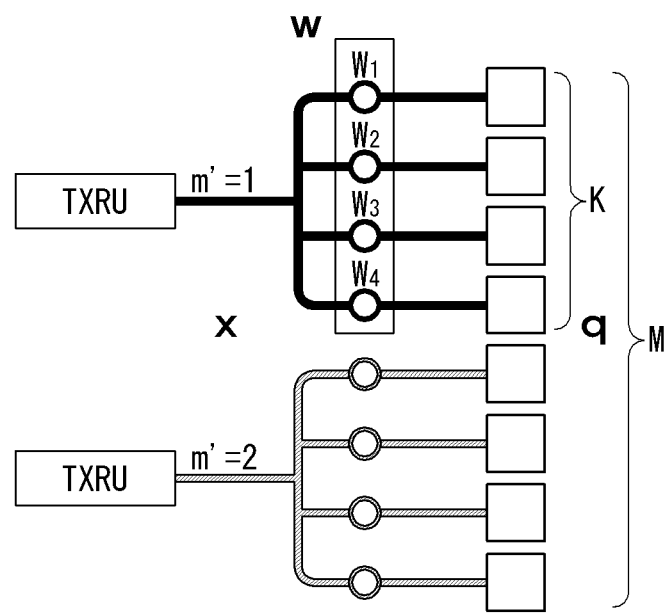
FIG. 6 exemplifies a sub-array partition model, which is a first TXRU virtualization model option.
Figure 7:
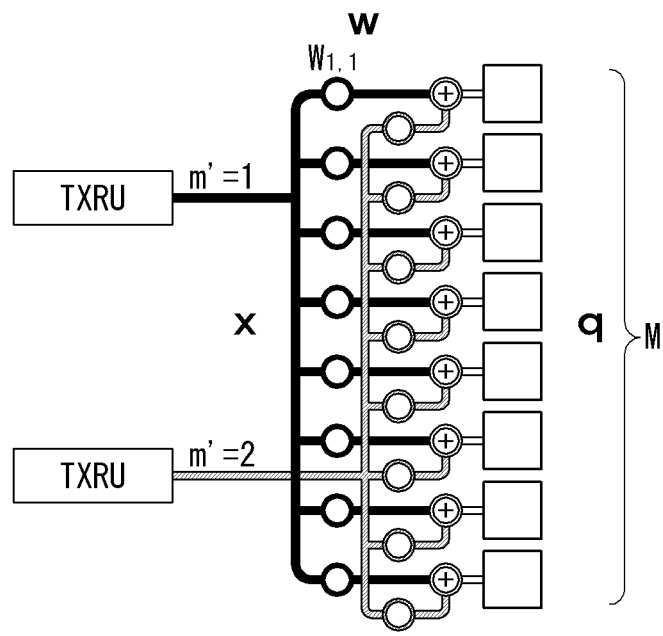
FIG. 7 exemplifies a full-connection model, which is a second TXRU virtualization model option.

FIGS. 6 and 7 illustrate a representative connection scheme between a TXRU and an antenna element. More particularly, FIG. 6 exemplifies a sub-array partition model, which is a first TXRU virtualization model option and FIG. 7 exemplifies a full-connection model, which is a second TXRU virtualization model option. In FIGS. 6 and 7, TXRU virtualization model represents a relation between an output signal of a TXRU and an output signal of an antenna element.

As shown in FIG. 6, in the case of the virtualization model in which a TXRU is connected to a sub-array, an antenna element is connected to only a single TXRU. Different from this, in the case of the virtualization model in which a TXRU is connected to all antenna elements, an antenna element is connected to all TXRUs. In these drawings, W represents a phase vector which is multiplied by an analog phase shifter. That is, a direction of analog beamforming is determined by W. Here, mapping between CSI-RS antenna ports and TXRUs may be 1 to 1 (1:1) or 1 to many (1:N).

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is mainly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna should be detected in order to accurately receive the signal. Accordingly, each transmission antenna should have an individual reference signal.

Ina mobile communication system, an RS may be basically divided into two types depending on its purpose. There are an RS having a purpose of obtaining channel state information and an RS used for data demodulation. The former has a purpose of obtaining, by a UE, to obtain channel state information in the downlink, and accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used only for data demodulation, and the CRS is used for the two purposes of channel information acquisition and data demodulation.

The reception side (i.e., UE) measures a channel state based on a CRS and feedbacks an indicator related to channel quality, such as a channel quality indicator (CQI), a precoding matrix index (PMI) and/or a rank indicator (RI), back to the transmission side (i.e., an eNB). The CRS is also called a cell-specific RS. On the other hand, a reference signal related to the feedback of channel state information (CSI) may be defined as a CSI-RS.

In 3GPP LTE(-A) system, it is defined that a UE reports CSI to a BS. Here, the CSI is commonly called for the information that may represent a quality of a radio channel (or also referred to as a link) established between a UE and an antenna port. For example, the CSI may correspond to a rank indicator (RI), a precoding matrix indicator (PMI), and/or a channel quality indicator (CQI), and the like. Here, RI represents rank information of a channel, and this may mean the number of streams that a UE receives through the same time-frequency resource. Since RI is determined with being dependent upon long-term fading of a channel, the RI is fed back from a UE to a BS with a period longer than CQI, generally. PMI is a value that reflects a channel space property, and represents a precoding index that a UE prefers based on a metric such as SINR. CQI is a value that represents signal strength, and means a reception SINR that is obtainable when a BS uses the PMI, generally.

In 3GPP LTE(-A) system, a BS may setup a plurality of CSI processes to a UE, and may receive CSI report for each process. Here, the CSI process may include CSI-RS for signal quality measurement from a BS and CSI-interference measurement (CSI-IM) resource for interference measurement.

The DRS may be transmitted through resource elements if data demodulation on a PDSCH is required. A UE may receive information about whether a DRS is present through a higher layer, and the DRS is valid only in the case that a corresponding PDSCH has been mapped. The DRS may also be called a UE-specific RS or Demodulation RS (DMRS).

Figure 8A:
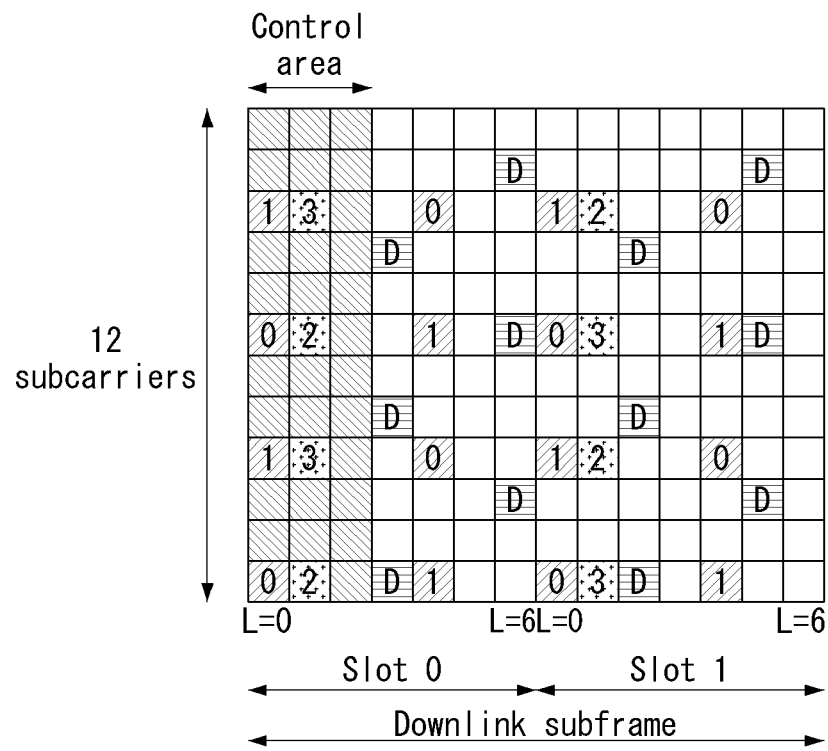
FIGS. 8A and 8B illustrate reference signal patterns mapped to downlink resource block pairs in a wireless communication system to which the present invention may be applied.
Figure 8B:
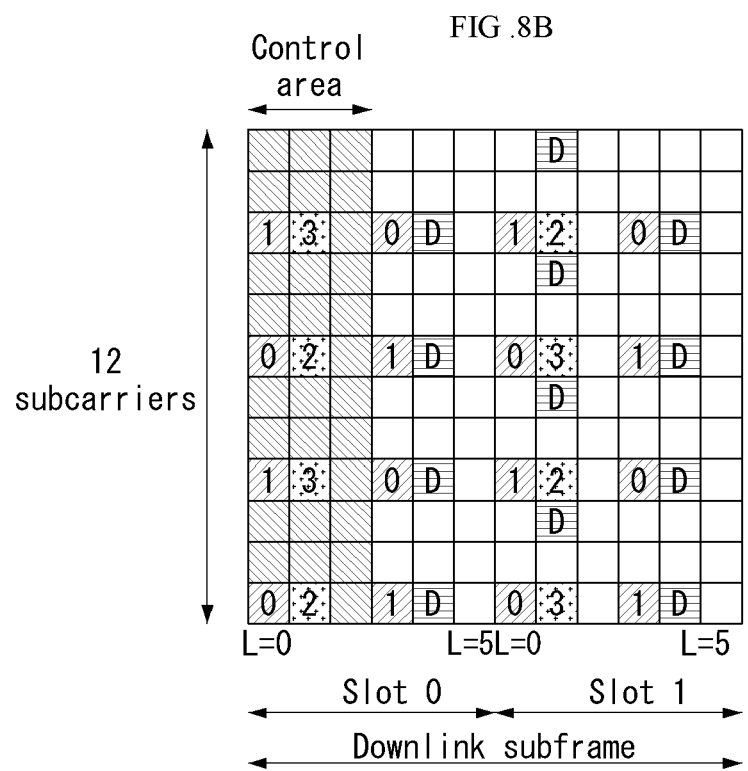

FIGS. 8A and 8B illustrate reference signal patterns mapped to downlink resource block pairs in a wireless communication system to which the present invention may be applied.

Referring to FIGS. 8A and 8B, a downlink resource block pair, a unit in which a reference signal is mapped may be represented in the form of one subframe in a time domain X 12 subcarriers in a frequency domain. That is, in a time axis (an x axis), one resource block pair has a length of 14 OFDM symbols in the case of a normal cyclic prefix (CP) (in FIG. 7(a)) and has a length of 12 OFDM symbols in the case of an extended cyclic prefix (CP) (FIG. 7(b)). In the resource block lattice, resource elements (REs) indicated by '0', '1', '2', and '3' mean the locations of the CRSs of antenna port indices '0', '1', '2', and '3', respectively, and REs indicated by 'D' mean the location of a DRS.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user MIMO antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an evolved and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, in the case that an eNB has four to a maximum of eight downlink transmission antennas in the LTE-A system, RSs for these antenna ports must be additionally defined and designed. Regarding the RSs for the maximum of eight transmission antenna ports, both of the aforementioned RS for channel measurement and the aforementioned RS for data demodulation should be designed.

One of important factors considered in designing an LTE-A system is backward compatibility, that is, that an LTE UE should operate properly also in the LTE-A system, which should be supported by the system. From an RS transmission aspect, in the time-frequency domain in which a CRS defined in LTE is transmitted in a full band every subframe, RSs for a maximum of eight transmission antenna ports should be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement purpose for the selection of MCS or a PMI (channel state information-RS, channel state indication-RS (CSI-RS), etc.) and an RS for the demodulation of data transmitted through eight transmission antennas (data demodulation-RS (DM-RS)).

The CSI-RS for the channel measurement purpose is characterized in that it is designed for a purpose focused on channel measurement unlike the existing CRS used for purposes of measurement, such as channel measurement and handover, and for data demodulation. Furthermore, the CSI-RS may also be used for a purpose of measurement, such as handover. The CSI-RS does not need to be transmitted every subframe unlike the CRS because it is transmitted for a purpose of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, in the case that RSs for a maximum of eight transmission antennas are transmitted in a full band in every subframe using the same method as the CRS in the existing LTE, RS overhead is excessively increased. Accordingly, in the LTE-A system, an RS has been separated into the CSI-RS of the CSI measurement purpose of the selection of MCS or a PMI and the DM-RS for data demodulation, and thus the two RSs have been added. The CSI-RS may also be used for a purpose, such as RRM measurement, but has been designed for a main purpose of the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE should be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB should notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined only for a subcarrier interval $\Delta f=15$ kHz.

RS virtualization

In mmW band, a PDSCH transmission is available only to a single analog beam direction on a time by analog beamforming. As a result, an eNB is able to transmit data only to a small number of UEs in a specific direction. Accordingly, on occasion demands, analog beam direction is differently configured for each antenna port, and a data transmission may be performed to a plurality of UEs in several analog beam directions simultaneously.

Figure 9A:
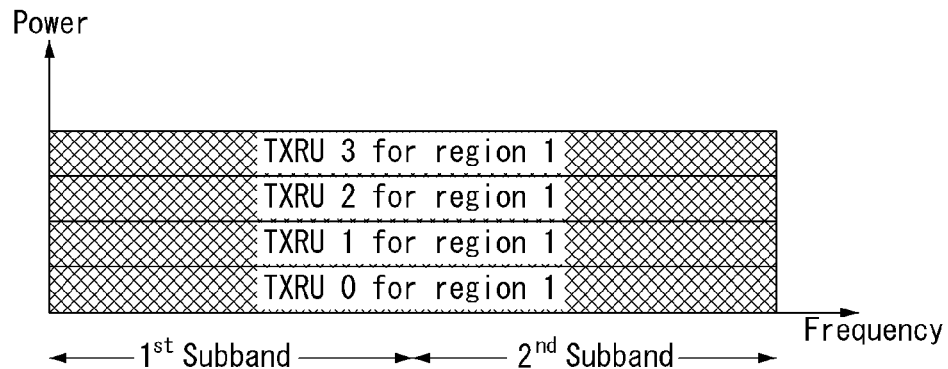
FIGS. 9A through 9C are diagrams illustrating a service area for each TXRU.
Figure 9B:
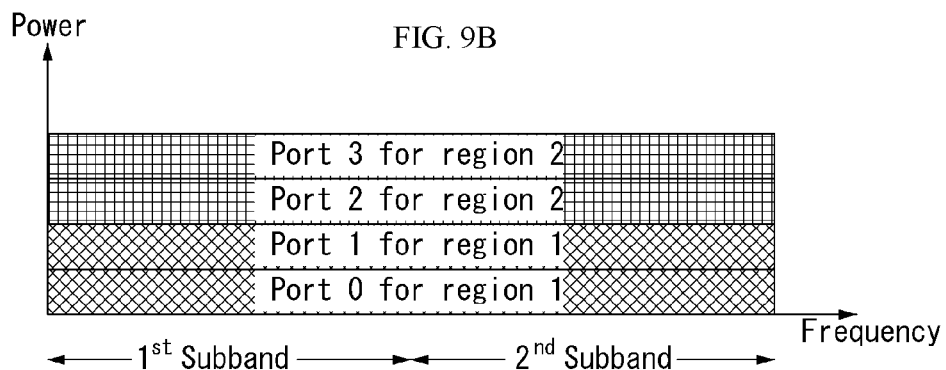
Figure 9C:
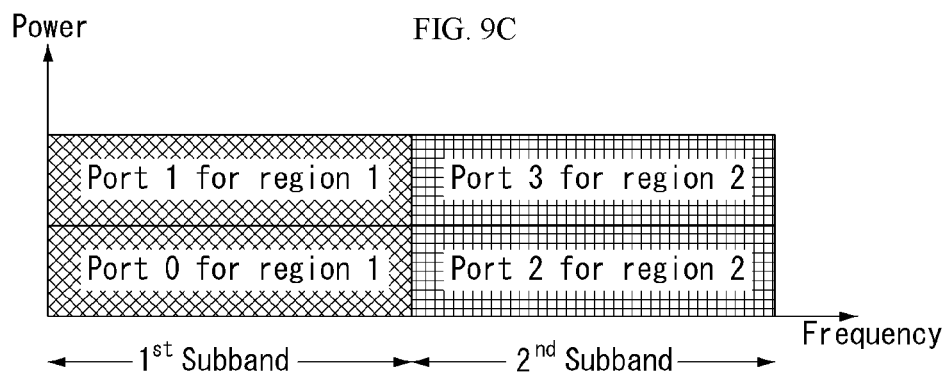

Hereinafter, four sub-arrays are formed by dividing 256 antenna elements into four equal parts, and an exemplary structure in which a TXRU is connected to each sub-array shown in FIGS. 9A through 9C is described mainly.

FIGS. 9A through 9C is a diagram illustrating a service area for each TXRU.

When each sub-array includes total 64 (8×8) antenna elements in 2-dimensional array shape, a region corresponding to a horizontal angle area of 15 degrees and a vertical angle area of 15 degrees may be covered by specific analog beamforming. That is, a region in which an eNB is needed to serve is divided into a plurality of areas, and each area is served at a time. In the following description, it is assumed that CSI-RS antenna port and TXRU are mapped in 1-to-1 manner. Accordingly, an antenna port and a TXRU may have the same meaning in the following description.

As shown in an example of FIG. 9A, in the case that all TXRUs (antenna port, sub-array) have the same analog beamforming direction, the throughput of the corresponding region may be increased by forming a digital beam having higher resolution. In addition, the throughput of the corresponding region may be increased by increasing rank of transmission data to the corresponding region.

As shown in FIG. 9B, in the case that each TXRU (antenna port, sub-array) has different analog beamforming direction, a simultaneous data transmission becomes available in a corresponding subframe (SF) to UEs distributed in wider area. For example, among four antenna ports, two of them are used for a PDSCH transmission to UE1 in area 1 and the remaining two of them are used for a PDSCH transmission to UE2 in area 2.

FIG. 9B shows an example that PDSCH 1 transmitted to UE1 and PDSCH 2 transmitted to UE2 are Spatial Division Multiplexed (SDM). Different from this, FIG. 9C shows an example that PDSCH 1 transmitted to UE1 and PDSCH 2 transmitted to UE2 may be transmitted by being Frequency Division Multiplexed (FDM).

Between the scheme of serving an area by using all antenna ports and the scheme of serving several areas simultaneously by dividing antenna ports, in order to maximize cell throughput, a preferred scheme may be changed depending on a RANK and an MCS served to a UE. In addition, a preferred scheme may also be changed depending on an amount of data to be transmitted to each UE.

An eNB calculates cell throughput or scheduling metric that may be obtained when serving an area by using all antenna ports, and calculates cell throughput or scheduling metric that may be obtained when serving two areas by dividing antenna ports. The eNB compares the cell throughput or the scheduling metric that may be obtained through each scheme, and selects a final transmission scheme. Consequently, the number of antenna ports participated in a PDSCH transmission is changed for each SF (SF-by-SF). In order for an eNB to calculate a transmission MCS of a PDSCH according to the number of antenna ports and reflect it to scheduling algorithm, a CSI feedback from a UE proper to it may be requested.

Beam reference signal (BRS) and Beam refinement reference signal (BRRS)

BRSs may be transmitted in at least one antenna port p={0, 1, . . . , 7}. BRS sequence $r_l(m)$ may be defined as Equation 1 below.

$$r_l(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 8 \cdot (N_{RB}^{max,DL} - 18) - 1$$
[Equation 1]

In Equation 1, $l$ =0, 1, . . . , 13 may represents an OFDM symbol number. In addition, c(i) represents a pseudo-random sequence generator, and may be initialized by Equation 2 on a starting point of each OFDM symbol.

$$C_{init} = 2^{10} \cdot (7 \cdot (n_s + 1) + l' + 1) \cdot (2 \cdot N_{ID}^{cell} + 1) + 2 \cdot N_{ID}^{cell} + 1$$
$$n_s = \left\lfloor \frac{l}{7} \right\rfloor$$
$$l' = l \bmod 7$$
[Equation 2]

BRRS may be transmitted in maximum eight antenna ports p=600, . . . , 607. A transmission and a reception of BRRS may be dynamically scheduled in a downlink resource allocation in xPDCCH.

BRRS sequence $r_{l,n_s}(m)$ may be defined as Equation 3 below.

$$r_{l,n_s}(m) = \frac{1}{\sqrt{2}}(1 - 2c(2m)) + j\frac{1}{\sqrt{2}}(1 - 2c(2m+1)),$$
$$m = 0, 1, \ldots, \left\lfloor \frac{3}{8} N_{RB}^{max,DL} \right\rfloor - 1$$
[Equation 3]

In Equation 3, ns represents a slot number in a radio frame, l represents an OFDM symbol number in the slot, and c(n) represents a pseudo-random sequence. The pseudo-random sequence generator may be initialized by Equation 4 on a starting point of each OFDM symbol.

$$c_{init} = 2^{10}(7(\bar{n}_s+1)+l+1)(2N_{ID}^{BRRS}+1)+2N_{ID}^{BRRS}+1$$
$$\bar{n}_s = n_s \bmod 20$$
[Equation 4]

In Equation 4, $N_{ID}^{BRRS}$ may be set to a UE through Radio Resource Control (RRC) signaling.

BRS may be transmitted in every subframe, and may be transmitted in different analog beam directions for each port. Such a BRS may be used for an eNB to determine an approximate beam direction for a UE. When an approximate beam direction for a UE is determined based on BRS, an eNB may transmit BRRS for each of more accurate/minute analog beam directions within the determined analog beam direction range, and may determine more accurate analog beam direction.

As such, the name for the reference signal used for determining an analog beam direction for a UE is not limited to the BRS or the BRRS described above, and it is apparent that the name may be substituted by/referred to various reference signals that are usable for performing the same function. For example, the BRS may be substituted by/referred to primary/first CSI-RS, Primary synchronization signal/sequence (PSS), Secondary synchronization signal/sequence (SSS), Synchronization Signal/Sequence (SS) block, NR-PSS, and/or NR-SSS, and the BRRS may be substituted by/referred to secondary/second CSI-RS.

DL Phase noise compensation reference signal (DL PCRS)

A PCRS associated with xPDSCH may be transmitted in antenna port P=60 or P=61 as it is signaled in a DCI format. The PCRS is existed only in the case that xPDSCH transmission is associated with a corresponding antenna port, and the PCRS in this case may be a valid reference for phase noise compensation. The PCRS may be transmitted only in physical resource blocks and symbols to which corresponding xPDSCH is mapped. The PCRS may be the same in all symbols that correspond to xPDSCH allocation.

For both of the antenna ports P=60, 61, PCRS sequence r(m) may be defined as Equation 5 below.

$$r(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, \lfloor N_{RB}^{max,DL}/4 \rfloor - 1$$
[Equation 5]

In Equation 5, c(i) represents pseudo-random sequence. The pseudo-random sequence generator may be initialized by Equation 6 on a starting point of each subframe.

$$c_{init}=(\lfloor n_s/2 \rfloor+1) \cdot (2n_{ID}^{(nSCID)}+1) \cdot 2^{16}+n_{SCID}$$
[Equation 6]

In Equation 6, $n_{ID}^{(f)}$ may be determined as below when i=0, 1.

In the case that a value for $n_{ID}^{PCRS,i}$ is not provided by a higher layer, $n_{ID}^{(t)}=N_{ID}^{cell}$ Otherwise, $n_{ID}^{(t)}=n_{ID}^{PCRS,i}$ A value of n_SCID may be set to 0, unless it is particularly determined. In xPDSCH transmission, n_SCID may be provided by a DCI formation associated with xPDSCH transmission.

Quasi Co-Located (QCL) Between Antenna Ports

In the present invention, when a UE receives data (e.g., PDSCH), a scheme is considered for demodulating the data using a UE-specific RS like a specific DMRS. Since such a DMRS is transmitted together with scheduled RB(s) of the corresponding PDSCH only and during only a time duration in which a scheduled PDSCH is transmitted, there may be a restriction in reception performance in performing channel estimation only with the corresponding DMRS. For example, for performing channel estimation, an estimation value of major large-scale parameter/property (LSP) of a radio channel is required, and DMRS density may be in short to obtain only the DMRS existed in time/frequency domain through which the scheduled PDSCH is transmitted. Accordingly, in order to support such a UE implementation, in LTE-A, the following quasi co-location signaling/assumption/behavior between RS ports is defined, and accordingly this, the methods of configuring/operating a UE are supported.

Quasi co-located and quasi co-location (QC/QCL) may be defined as follows.

If two antenna ports have a QC/QCL relationship (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE may perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property may be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several several tens of ms, and each resource block has also low density of 1 resource element for each antenna port in average. Accordingly, the CSI-RS may experience performance deterioration if it is used to estimate the large-scale property of a wireless channel.

That is, UE may perform the detection/reception, channel estimation, and channel state report of a downlink reference signal through a QC/QCL assumption between antenna ports.

Meanwhile, a UE may assume that antenna ports 0-3 of a serving cell and an antenna port for PSS/SSS are in QCL relation for Doppler shift and average delay.

PDSCH resource mapping parameters

A UE configured with transmission mode 10 for a given serving cell may be configured with up to four parameter sets by higher layer signaling in order to decode a PDSCH according to detected PDCCH/EPDCCH that has DCI format 2D which is intended for the UE and the given serving cell.

In order for the UE to determine PDSCH RE mapping and to determine PDSCH antenna port QCL when the UE is configured with Type B QCL type, the UE uses the parameter configured according to 'PDSCH RE Mapping and Quasi-Co-Location indicator' field value, which is described in below Table 3, in the detected PDCCH/EPDCCH that has DCI format 2D.

In the case of a PDSCH that has no corresponding PDCCH/EPDCCH, the UE uses the parameter set indicated in the PDCCH/EPDCCH that has DCI format 2D corresponding to SPS activation which is associated to determine PDSCH RE mapping and PDSCH antenna port QCL.

TABLE 3

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port QCL are configured through higher layer signaling for each parameter set.
crs-PortsCount-r11
crs-FreqShift-r11
mbsfn-SubframeConfigList-r11
csi-RS-ConfigZPId-r11
pdsch-Start-r11
qcl-CSI-RS-ConfigNZPId-r11 zeroTxPowerCSI-RS2-r12 (when a UE is configured with higher layer parameter CSI-Reporting-Type for a TDD serving cell)

In the case that a PDSCH is decoded according to detected PDCCH/EPDCCH having DCI format 1A that has CRC scrambled with C-RNTI intended for a use of a UE and a given serving cell, and a UE is configured with Type B QCL type for PDSCH transmission in antenna port 7, in order to determine PDSCH RE mapping and PDSCH antenna port QCL, a UE to which transmission mode 10 for a given serving cell is set should use parameter set 1 in Table 3.

In order to decode a PDSCH corresponding to PDCCH/EPDCCH having DCI format 1A that has CRC scrambled with SPS C-RNTI and PDSCH without corresponding PDCCH/EPDCCH associated with SPS activation indicated by PDCCH/EPDCCH having DCI format 1A, a UE to which transmission mode 10 for a given serving cell is set should use parameter set 1 in Table 3 in order to determine PDSCH RE mapping and PDSCH antenna port QCL.

In order to decode a PDSCH according to detected PDCCH/EPDCCH having DCI format 1A for a UE in a given serving cell, and to transmit a PDSCH in antenna ports 0-3, a UE set to transmission mode 10 for a given serving cell should determine PDSCH RE mapping using the lower indexed zero-power CSI-RS.

Antenna port QCL for PDSCH

A UE configured with transmission modes 8-10 for a serving cell may assume that antenna ports 7-14 for the serving cell is in QCL for a given subframe for delay spread, Doppler spread, Doppler shift, average gain and average delay.

A UE configured with transmission modes 1-10 for a serving cell may assume that antenna ports 0-3, 5, 7-30 for the serving cell is in QCL for Doppler shift, Doppler spread, average delay and delay spread.

A UE configured with transmission mode 10 for a serving cell is configured with one of two QCL types for the serving cell by higher layer parameter QCL operation in order to decode a PDSCH according to a transmission scheme in relation to antenna ports 7-14.

Type A: For a UE, antenna ports 0-3, 7-30 of a serving cell is in QCL for delay spread, Doppler spread, Doppler shift and average delay.

Type B: For a UE, antenna ports 15-30 that corresponds to a CSI-RS resource configuration identified by higher layer parameter qcl-CSI-RS-ConfigNZPId-r11 and antenna ports 7-14 associated with a PDSCH is in QCL for Doppler shift, Doppler spread, average delay and delay spread.

In the case of LAA Scell, a UE does not expect that it is configured with QCL type B.

Channel-State Information (CSI)—Reference Signal (CSI-RS) definition

With respect to a serving cell and a UE that are configured with transmission mode 9 and not configured with higher layer parameter eMIMO-Type, the UE may be configured with a single CSI-RS resource configuration.

In addition, with respect to a serving cell and a UE that are configured with transmission mode 9, configured with higher layer parameter eMIMO-Type and of which eMIMO-Type is CLASS A, the UE may be configured with a single CSI-RS resource configuration.

With respect to a serving cell and a UE that are configured with transmission mode 9, configured with higher layer parameter eMIMO-Type and of which eMIMO-Type is CLASS B, the UE may be configured with one or more CSI-RS resource configurations.

With respect to a serving cell and a UE that are configured with transmission mode 10, the UE may be configured with one or more CSI-RS resource configuration(s). The following parameters that the UE assumes non-zero transmission power for a CSI-RS is configured through higher layer signaling for each CSI-RS resource configuration:

CSI-RS resource configuration identity when a UE is configured with transmission mode 10

The number of CSI-RS ports

CSI RS configuration

CSI RS subframe configuration ICSI-RS

UE assumption for a reference PDSCH transmission power Pc for CSI feedback, when a UE is configured with transmission mode 9

UE assumption for a reference PDSCH transmission power Pc for CSI feedback for each CSI process, when a UE is configured with transmission mode 10.

In the case that CSI subframe sets CCSI,0 and CCS,1 are configured by higher layer signaling for a single CSI process, Pc is configured for each of the CSI subframe sets of the corresponding CSI process.

Pseudo-random sequence generator parameter nID

CDM type parameter, when a UE is configured with higher layer parameter eMIMO-Type and the eMIMO-Type is set to 'CLASS A'.

Higher layer parameter qcl-CRS-Info-r11CRS, when a UE is configured with transmission mode 10, UE assumption of CRS antenna port that has the following parameters and CSI-RS antenna ports:

qcl-ScramblingIdentity-r11.

crs-PortsCount-r11.

mbsfn-SubframeConfigList-r11.

Pc is an assumed ratio of PDSCH EPRE for CSI-RS EPRE when a UE derives CSI feedback and takes a value in a range of [−8, 15] dB with 1 dB step size. Here, the PDSCH EPRE corresponds to symbol number for a ratio of the PDSCH EPRE with respect to cell-specific RS EPRE.

A UE does not expect configuration of CSI-RS and PMCH in the same subframe of a serving cell.

With respect to frame structure type 2 serving cell and 4 CRS ports, a UE does not expect to receive CSI-RS configuration index belonged to set [20 −31] for a normal CP case or set [16 −27] for an extended CP case.

A UE may assume that CSI-RS antenna port of CSI-RS resource configuration is in QCL for delay spread, Doppler spread, Doppler shift, average gain and average delay.

A UE configured with transmission mode 10 and QCL type B may assume that antenna ports 0 to 3 associated with qc-CRS-Info-r11 corresponding to CSI-RS resource configuration and antenna ports 15 to 30 corresponding to CSI-RS resource configuration are in QCL for Doppler shift and Doppler spread.

A UE configured with transmission 10, configured with higher layer parameter eMIMO-Type and the eMIMO-Type is set to 'class B', in which the number of configured CSI resources is more than one for a single CSI process and having QCL type B does not expect to receive CSI-RS resource configuration for a CSI process that has different value of higher layer parameter qc-CRS-Info-r11.

BL/CE UE configured with CEModeA or CEModeB does not expect that it is configured with non-zero transmission power CSI-RS.

CSI Reporting Method

With an introduction of Full Dimension (FD)-MIMO (or may also be referred to as Massive-MIMO, enhanced-MIMO, Large-Scale Antenna System, Very Large MIMO, Hyper-MIMO, etc.), an eNB may increase throughput of a system by performing D-beamforming and the like using N (N>>1) antenna ports (or corresponds to "element" according to specific port-to-element virtualization, and hereinafter, commonly referred to as "port" for the convenience of description).

Currently, 3GPP Rel-13 defines CSI-RS operation (or CSI reporting operation, each CSI process may be associated with a single CSI-RS resource and a single CSI-IM resource) of non-precoded scheme defined as Class A and CSI-RS operation (or CSI reporting operation, each CSI process may be associated with one or more CSI-RS resources and one or more CSI-IM resources) of beamformed scheme defined as Class B.

In the case of Class A, in the FD MIMO system, an eNB may configure several CSI-RS resources to a UE in a single CSI process. A UE merges each of CSI-RS resources configured in a single CSI process into a single large CSI-RS resource, not regarding it as an independent channel, and feedbacks by calculating/obtaining CSI from the corresponding resource. For example, in the case that an eNB configures three 4-port CSI-RS resources to a UE in a single CSI process, the UE merges the configured three 4-port CSI-RS resources and assumes it as a single 12-port CSI-RS resource. The UE feedbacks by calculating/obtaining CSI using 12-port PMI from the corresponding resource.

Even in the case of Class B, in the FD MIMO system, an eNB may configure several CSI-RS resources to a UE in a single CSI process. For example, in a single CSI process, an eNB may configure eight 4-port CSI-RS resources to a UE. Different virtualizations are applied to the respective eight 4-port CSI-RS, and different beamformings with each other may be applied. For example, assuming the case that vertical beamforming is applied with zenith angle of 100 degrees to a first CSI-RS, vertical beamforming may be applied to second to eighth CSI-RSs with zenith angle difference of 5 degrees, and as a result, vertical beamforming may be applied to the eighth CSI-RS with zenith angle of 135 degrees.

In this case, the UE assumes each of the configured CSI-RS resources as an independent channel, and selects one of the configured CSI-RS resources, and then feedbacks/reports by calculating/obtaining CSI based on the selected resource. That is, a UE may select a CSI-RS resource of which channel is robust among the configured eight 4-port CSI-RS resources, and calculate CSI based on the selected CSI-RS resource, and then report it to the eNB. In this case, the UE may report the selected CSI-RS resource through CSI-RS Resource Index (CRI) value. For example, in the case that the first CSI-RS resource channel is the strongest, the UE may set the CSI value to 'O' and report it to the eNB.

In order to represent the technical features described above, in Class B CSI process, the following variables may be defined. K may mean the number of CSI-RS resources existed in the CSI process, and Nk may mean the number of CSI-RS resources of the kth CSI-RS resource. For example, a UE is configured with eight 4-port CSI-RS resources, K is 8 and Nk is 4 regardless of k value.

In current Rel-13, CRI indicates a specific CSI-RS resource only, but a future CRI may be further materialized to indicate a specific port combination. For example, it may be further materialized that CRI indicates a single CSI-RS resource selected among eight CSI-RS resources in a CSI process, and indicates that an additionally selected CSI-RS resource is constructed by a combination of ports #15 and #16. At this time, assuming that the CRI may indicate a combination of ports #15 and #16 or ports #17 and #18 for each CSI-RS resource, the CRI may be set as one of 16 (=2^4) values.

That is, the case of being configured with CRI=0 indicates a combination of ports #15 and #16 of the first CSI-RS resource, the case of being configured with CRI=1 indicates a combination of ports #17 and #18 of the first CSI-RS resource, the case of being configured with CRI=2 indicates a combination of ports #15 and #16 of the second CSI-RS resource, the case of being configured with CRI=3 indicates a combination of ports #17 and #18 of the second CSI-RS resource, and in such schemes, each of the combinations of CSI-RSs may be indicated according to an ascending order of CRI values. In addition, finally, it may be identified that the case of being configured with CRI=15 indicates a combination of ports #17 and #18 of the last eighth CSI-RS resource.

In the case of Class A, a UE measures N antenna ports, and selects N-port precoder by using it, and then reports the related CSI (PMI, CQI, RI, etc.) to an eNB. However, as N increases, the CSI-RS for a channel measurement of a UE needs to be also increased, and the related codebook size is also increased, and consequently, feedback overhead is also increased.

On the other hand, in the case of Class B, the number of CSI-RS ports is in relation to a maximum rank of a UE, rather than the number of antenna ports of an eNB, and accordingly, there is an advantage that the CSI-RS ports may be used without big increase of the number of CRI-RSs even in the case that the number of antenna ports is increased. However, a beam selection needs to be performed in an eNB, and accordingly, there is a disadvantage that the robustness of beamforming may be degraded in the environment that mobility of a UE is high and a beam of an eNB is narrow.

In order to compensate the disadvantage of the two techniques and to maximize the advantage, it may be considered the hybrid CSI-RS based scheme (or CSI reporting scheme) that uses a combination of Class A and Class B.

Assumptions Independent of Physical Channel

A UE should not assume that two antenna ports are in QCL unless otherwise specified.

A UE may assume that antenna ports 0 to 3 for a serving cell is in QCL for delay spread, Doppler spread, Doppler shift, average gain and average delay.

For the purpose of discovery signal-based measurement, a UE should not assume that there is another signal or physical channel except the discovery signal.

In the case that a UE supports discoverySignalsnDeactSCell-r12, the UE is configured by discovery signal-based RRM measurement in a carrier frequency applicable to a secondary cell in the same carrier frequency, the secondary cell is inactivated, and the UE is not configured by higher layer in order to receive MBMS in the secondary cell, except a discovery signal transmission, it is assumed that PSS, SSS, Physical Broadcast Channel (PBCH), CRS, PCFICH, PDSCH, PDCCH, EPDCCH, PHICH, DMRS and CSI-RS are not transmitted by the corresponding secondary cell until the subframe in which an activation command is received for the secondary cell.

QCL assumption and signaling method for new RAT

The UE performing the QCL operation, in the case that the UE configured with QCL Type B, may use LSPs estimated from a specific QCLed CSI-RS resource indicated a scheduling DCI in order to be assisted with channel estimation of a DMRS transmitted together with scheduled PDSCH. However, in the New RAT (NR) environment considered in the present invention, aperiodic CSI-RS transmission scheme is considered in the aspect that the transmission of CSI-RS itself is transmitted only when it is required departing from the conventional periodic scheme, and accordingly, there is a problem that the RS density for being utilized as CSI-RS for QCL assumption becomes in short significantly in comparison with the conventional system. Accordingly, hereinafter, it is proposed embodiments of various QCL operations considering aperiodic CSI-RS transmission scheme in such NR environment. Before the proposition, QCL parameters that may be defined in the NR environment will be described. However, the following QCL parameters are not limited to the NR environment, but may be applied to various wireless communication systems.

1. QCL parameter

As QCL parameters considered (in the NR environment), one of the followings may be defined/configured.

Delay spread
Doppler spread
Doppler shift
Average gain
Average delay
Average angle (AA):
Angular spread (AS)

In the NR environment, when the analog beamforming is applied to a UE side, a new type of QCL property for an arrival angle needs to be considered, and accordingly, the parameters in relation to a reception beam such as the AA and the AS may be defined as new type of QCL parameters.

Between antenna ports in which QCL is guaranteed in the AA aspect, QCL assumption for a reception beam direction (and/or reception beam width/sweeping degree) is available. For example, a UE is available to receive a transmission signal by setting a reception beam direction (and/or reception beam width/sweeping degree) of a transmission signal from other antenna port(s) in the same way as the AA estimated from specific antenna port(s) and in the similar way (in relation to this). When a UE operates as such, a reception performance may be guaranteed higher than a specific level. Such an AA may also be replaced by a term "(Almost) Dominant arrival angle" and the like, for example.

Consequently, the QCL assumption in the AA aspect, when assuming that there is a specific dominant (arrival) angle 'S' of a signal measured from a specific antenna port, it may be interpreted that the specific dominant (arrival) angle of a signal measured from other antenna port, which is QCL assumed (or has QCL relation) with this, is "almost" the same as/similar to the 'S'. That is, a receiver may in which QCL assumption is available may utilize/apply the AA estimated from the specific indicated QCLed RS/SS to a reception process almost at it is, and consequently, there is an advantage that an implementation/operation of an efficient receiver is available.

The QCL assumption in the AS aspect between two antenna ports means that the AS of a specific port may be derived/estimated/applied from the AS estimated from other port which is QCLed with the corresponding port.

The AS may be distinguished into Azimuth AS and Zenith AS, and in this case, the AS may be separately defined or defined together for each specific dimension. And/or, the AS may be distinguished into departure AS and arrival AS, and may be defined separately or together with for each distinguished AS.

In the AS aspect, between antenna ports in which QCL is guaranteed/assumed, the QCL assumption for a reception beam width/sweeping degree (and/or a reception beam direction) is available. For example, a UE may mean that a reception of a transmission signal is available by configuring a reception beam width/sweeping degree (and/or a reception beam direction) from other antenna port(s) identically or similarly (in relation to it) with the AS estimated from specific antenna port(s). When the UE operates as such, a reception performance is guaranteed higher than a specific level.

In summarizing the contents described above in relation to the AA and the AS, the AA may be interpreted as a parameter in relation to average (the most) valid/dominant beam/spatial direction/angle, and the AS may be interpreted as a parameter in relation to beam/space/angle spectrum/range for degree of spreading of beam direction by a reflector distribution (based/centered on AA).

The AA and AS are parameters used in QCL assumption for a reception beam/space/angle management function. Therefore, the AA and AS may be collectively called a reception beam parameter, a reception beam related parameter, a reception angle parameter, a reception angle related parameter, a spatial QCL parameter, a spatial parameter, or a spatial Rx parameter. Hereinafter, for convenience of description, the AA and AS will be collectively called the 'reception beam related parameter'.

As reception beam related parameters, Angle of Arrival (AoA), Dominant AoA, average AoA, Power Angular Spectrum (PAS) of AoA, average Angle of Departure (AoD), PAS of AoD, transmit/receive channel correlation, transmit/receive beamforming, spatial channel correlation, and the like may also be defined, which have the same/similar property as the AA and/or the AS described above.

QCL assumption between two antenna ports in terms of a power angle (-of-arrival) profile (PAP) means that PAP of a specific port may be derived/estimated/applied from PAP estimated from another port QCL with the corresponding port (that is, a characteristic that the PAPs of two ports are the same as or similar to each other may be derived/estimated/applied). The PAP as a PAP for azimuth and/or zenith angle-domain may be defined separately or defined together for each specific dimension. In addition/alternatively, the PAP may be defined separately or together in terms of a departure and/or an arrival.

The QCL guarantee/assumption in terms of the PAP may mean, for example, that a received beam width/sweeping degree (and/or received beam direction) when receiving a transmission signal from another antenna port(s) based on the PAP estimated from a specific antenna port(s) is set to be the same as or similar to a corresponding specific antenna port(s) (or associated therewith) to receive the transmission signal. Furthermore, the QCL guarantee/assumption in terms of the PAP may mean that the reception performance in this way is guaranteed at a specific level or higher.

In this specification, a new concept called "partial QCL (or may also be referred to as a similar/modified name such as sub-QCL, fractional QCL, or quasi-sub-location (QSL))" is introduced in association with the QCL parameter.

A relationship such as "partial QCL (or may also be referred to as a similar/modified name such as sub-QCL, fractional QCL, or quasi-sub-location (QSL))" may be established/configured/indicated between specific antenna ports with respect to the at least one QCL parameter. For example, it may be assumed/configured/indicated that the "partial QCL" is established between a signal (and/or a resulting experienced/observed (wireless) channel) transmitted from specific antenna port group A (e.g., the number of antenna port groups A may be one or more) and a signal (and/or a resulting experienced/observed (wireless) channel)

transmitted from specific antenna port group B (e.g., the number of antenna port groups B may be one or more). In this case, it may be assumed/applied/utilized that QCL parameter(s)/property(s) for antenna port group A is a "subset (a relationship included in the same or higher set)" of QCL parameter(s)/property(s) estimated from antenna port group B. This may mean that performance is guaranteed at a predetermined level or higher when an association operation is applied based on the assumption/application/utilization.

The "partial QCL" has significance in various environments. In a representative example, a case may be considered in which a plurality of physical antennas form a single antenna network (SFN) to form logical antenna port group A and logical antenna group B is mapped to individual physical antennas. That is, in a representative example, a case may be considered in which a plurality of physical antennas (in particular, when LSPs are different for each physical antenna) is mapped to antenna ports of logical antenna port group A and signals of corresponding antenna ports are transmitted through the plurality of antennas, but antenna ports of logical antenna port group B are mapped to any one of the plurality of physical antennas to which logical antenna port group A is mapped to transmit signals of corresponding ports through the one antenna. In the embodiment, a receiving end may derive the LSP of a channel to be experienced/transmitted by the signal transmitted through logical antenna port group B from the SLP of the channel acquired from the signal transmitted through logical antenna port group A (i.e., partial QCL relationship/assumption is established).

For example, when logical antenna port group B has the partial QCL relationship with respect to logical antenna port group A in a multipath fading panel environment, a relationship may be established/assumed in which channel delay values for/affecting the signal transmitted through logical antenna port group B are some of channel delay values for/affecting the signal transmitted through logical antenna port group A. In addition/alternatively, for example, when logical antenna port group B has the partial QCL relationship with respect to logical antenna port group A in the multipath fading panel environment, a relationship may be established/assumed in which channel Doppler values for/affecting the signal transmitted through logical antenna port group B are some of channel Doppler values for/affecting the signal transmitted through logical antenna port group A. The receiving end may configure a parameter/LSP for a channel estimator of the signal received through antenna port group B by using/based on the LSP acquired from the signal of logical antenna port group A by using such relationships. In addition/alternatively, for example, when logical antenna port group B has the partial QCL relationship with respect to logical antenna port group A in the multipath fading panel environment, a relationship may be established/assumed in which a reception beam direction (or angle/range) for receiving the signal transmitted through logical antenna port group B belongs to/is included in a reception beam direction (or angle/range) for receiving the signal transmitted through logical antenna port group A. The receiving end may search the reception beam direction (or angle/range) for receiving the signal transmitted through logical antenna port group B among the reception beam directions (or angles/ranges) for receiving the signal transmitted through logical antenna port group A by using such relationships. Therefore, the receiving end may improve a search speed of the reception beam direction and/or reduce complexity of reception processing.

2. Inter/Intra-RS/SS QCL Relation (In the NR environment,) At least one of the QCL parameters/properties described above may be supported to be used in a UE operation by being defined/configured between specific RS/SS (e.g., between RS/SS of different types with each other among the RS/SS described below or between RS/SS of the same types).

PSS and/or SSS (this may be commonly called 'synchronization sequence/signal (SS) block'.)
BRS
BRRS
CSI-RS
PCRS (Phase noise Compensation Reference Signal)
DMRS 3. BRRS (Beam Refinement Reference Signal) QCL In a beam refinement operation based on the BRRS, for channel estimation and the like for the BRRS itself, (when it is considered that a BRRS transmission in NR may have aperiodic property) it is required that RS density is supported such that the QCL assumption is available for a specific QCL parameter/property (e.g., {Doppler spread and/or Doppler shift}) from much higher BRS, and so on.

As such, the RS/SS QCLed with the BRRS may be provided together when the RRC of the corresponding BRRS is configured, and this may mean that semi-static QCL configuration for BRRS is supported. Otherwise, in order to provide more dynamic QCL configuration, QCL configuration of L2-level (and/or L1-level) may be configured/provided through medium access control (MAC) control element (CE) (and/or DCI) and so on for each BRRS. For example, all types of QCL configuration information of L2-level (and/or L1-level) may be provided to a UE (in real time) with full flexibility, or a plurality of candidate QCL configuration parameter sets is configured through RRC configuration and a UE is instructed through L2-level (and/or L1-level) signaling about which one is selected/applied/used among the parameter sets.

As an example of hierarchical QCL configuration instruction/signaling, a scheme is also available that an eNB configures a plurality of candidate QCL configuration parameter sets through RRC configuration to a UE, and filters 2^M (M>=1) parameter sets through L2-level signaling such as MAC CE primarily, and it may be instructed on which parameter set is selected/applied/used among the parameter sets that are filtered primarily through L1-level signaling through a specific DCI of N-bit field to a UE. In other words, QCL configuration may be hierarchized (e.g., through total third times) (or through a plurality of times) and instructed/provided to a UE, and may be instructed through RRC configuration primarily, L2-level signaling (e.g., MAC CE, etc.) secondarily, and L1-level signaling (e.g., DCI, etc.) thirdly. As such, hierarchized QCL configuration instruction scheme may be applied to the QCL configuration of other RS/SS in the same/similar manner as well as the QCL configuration of the BRRS.

As such, the signaling scheme of RS/SS (e.g., BRS and/or PSS/SSS) information QCLed (with BRRS) provided for the purpose of channel estimation/measurement of BRRS through dynamic indication of L1 (and/or L2)-level may be very efficient in a wireless communication system in which "aperiodic or on-demand" BRRS transmission is considered.

More particularly, a transmitter may set at least one BRRS (resource(s)) to a receiver in advance, and a transmitter (or an eNB) may instruct information for a receiver to receive each BRRS dynamically through L2-level (e.g., MAC CE) and/or L1-level (e.g., DCI). Here, the information for receiving each BRRS may include QCLed RS/SS information (with BRRS), for example, information of specific BRS port(s) and/or specific PSS/SSS. As a result, there is an advantage that a transmitter (or an eNB) is able to perform a proper (aperiodic/on-demand) BRRS transmission very flexibly by considering an instantaneous situation such as loading of a UE and traffic/channel condition, and the like by using BRRS transport resources that are preconfigured to a UE.

In order to support the operations described above efficiently, specific ID may be provided to each BRRS (or BRRS resource) and/or each BRRS port(s), and/or specific ID may be provided to each BRS (or BRS resource) and/or each BRS port(s). Such a specific ID may be indicated to a UE through QCL signaling for providing QCL configuration to the UE described above.

When an eNB indicates RS/SS (e.g., specific BRS port(s)) information QCLed for a specific BRRS to a UE (dynamically), the eNB may restrict QCL parameter/property to which QCL assumption is applied to a part of the numerated QCL parameters/properties.

For example, a UE may be restricted such that QCL assumption is available only for {Doppler spread, and/or Doppler shift} parameter/property. This is caused by the reason such as the case that there is a limitation in obtaining frequency synchronization only with the BRRS safely. Particularly, the QCL assumption between BRRS and a specific BRS may be support by an implementation scheme in the case that BRRS and BRS are generated from the same oscillator.

And/or, a UE may be restricted that QCL assumption is (also) available for {Delay spread, and/or Average delay} parameter/property. For example, an eNB may configure/support the LSP of BRS QCLed with BRRS to a UE in the case that the LSP is guaranteed when it may be inferred between BRRS and BRS (transmitted from the same panel antenna, etc.), and accordingly, an efficient receiver implementation may be supported.

And/or, a UE may be restricted that QCL assumption is (also) available for {Average angle and/or Angular spread} parameter/property. A reception (analog) beam coefficients generation for receiving BRRS may be applied by inferring from a beam coefficient generation which is applied when receiving BRS, and accordingly, there is an advantage that an efficient receiver implementation may be supported. Otherwise, considering that the AA of BRRS may be deviated with an angle different from the AA of BRS with a specific level or higher, it may be set to a UE such that only "AS" is reflected (i.e., QCL assumption) (additionally).

4. CSI-RS QCL

In CSI-RS based CSI measurement and reporting operation, when a channel for CSI-RS itself is measured, (considering that CSI-RS transmission may have aperiodic property in NR) it is required to support the QCL assumption for specific QCL parameter/property (e.g., Doppler spread and Doppler shift) from BRS or BRRS of which RS density is greater. The information of RS/SS which is QCLed (with CSI-RS) may be provided when RRC of the corresponding CSI-RS is configured together, and this may be interpreted that semi-static QCL configuration for CSI-RS is supported.

Alternatively, in order to provide more dynamic QCL configuration, the QCL configuration of L2-level (and/or L1-level) through MAC (medium access control) CE (control element)(and/or DCI) may be configured/provided for each CSI-RS (resource). For example, all types of QCL configuration information of L2-level (and/or L1-level) may be provided to a UE (in real time) with full flexibility, or a plurality of candidate QCL configuration parameter sets is configured through RRC configuration and a UE is instructed through L2-level (and/or L1-level) signaling about which one is selected/applied/used among the parameter sets.

As an example of hierarchical QCL configuration instruction/signaling, a scheme is also available that an eNB configures a plurality of candidate QCL configuration parameter sets through RRC configuration to a UE, and filters $2^M$ (M>=1) parameter sets through L2-level signaling such as MAC CE primarily, and it may be instructed on which parameter set is selected/applied/used among the parameter sets that are filtered primarily through L1-level signaling through a specific DCI of N-bit field to a UE. In other words, QCL configuration may be hierarchical (e.g., through total third times) (or through a plurality of times) and instructed/provided to a UE, and may be instructed through RRC configuration primarily, L2-level signaling (e.g., MAC CE, etc.) secondarily, and L1-level signaling (e.g., DCI, etc.) thirdly. As such, hierarchical QCL configuration instruction scheme may be applied to the QCL configuration of other RS/SS in the same/similar manner as well as the QCL configuration of the CSI-RS.

As such, the signaling scheme of RS/SS (e.g., BRS and/or PSS/SSS) information QCLed (with CSI-RS) provided for the purpose of channel estimation/measurement of BRRS through dynamic indication of L1 (and/or L2)-level may be very efficient in a wireless communication system in which "aperiodic or on-demand" CSI-RS transmission is considered.

More specifically, a transmitter may set at least one CSI-RS (resource(s)) to a receiver in advance. Instead of configuring all types of configuration information (e.g., port number/(# of ports), scrambling ID, time/frequency RE pattern, port subset (actually allocated port), QCLed (with CSI-RS) RS/SS information, and/or subframe period/offset) for CSI-RS measurement for each CSI-RS ID (or CSI-RS resource configuration) semi-statically, only a part of information (e.g., port number/(# of ports), scrambling ID, and/or time/frequency RE pattern) among these may be configured (e.g., through RRC) semi-statically. In this case, a transmitter may indicate the remaining information elements except the information element semi-statically configured through L2-level (e.g., MAC CE) and/or L1-level (e.g., DCI). The remaining information elements may include QCLed (with CSI-RS) RS/SS information, for example, information of specific BRS/BRRS port(s) and/or specific PSS/SSS and the like. Here, semi-static configuration may mean that a specific set among preconfigured candidate parameter sets is dynamically selected.

As a result, there in an advantage that a transmitter (or an eNB) is able to perform a proper (aperiodic/on-demand) CSI-RS transmission very flexibly by considering an instantaneous situation such as loading of a UE and traffic/channel condition, and the like by using CSI-RS transport resources that are preconfigured to a UE.

In this embodiment, at least one CSI-RS (resource(s)) configured to a UE in semi-static manner may be interpreted as at least one "CSI-RS container(s) each with corresponding ID". As such, transmission of each "CSI-RS container" on which aperiodic/"on-demand" CSI-RS is carried has an advantage that efficiency of using CSI-RS transport resource is maximized such that an eNB indicates optimal beamforming and QCLed RS/SS dynamically associated with the corresponding CSI-RS on every transmission time.

The QCL assumption different from RS/SS may be configured/indicated independently for each CSI-RS resource to at least one CSI-RS resource set to a receiver (or UE). For example, assuming that CSI-RS #1 and #2 are set to a UE, it may be configured/indicated that CSI-RS #1 is QCL-assumed with specific BRS, and CSI-RS #2 is QCL-assumed with specific BRRS. At this time, CSI-RS #1 may correspond to non-precoded CSI-RS, and/or CSI-RS for CSI-RS measurement initial step (e.g., CSI-RS #1 for hybrid CSI reporting based on CSI-RS #1 and #2), and in this case, it may be configured/indicated that CSI-RS #1 is QCLed with specific BRS. On the contrary, CSI-RS #2 may correspond to CSI-RS #2 configured for the purpose of link adaptation for improving transmission efficiency by an eNB in a state that beamformed CSI-RS, and/or a UE access a specific BRS using serving-beam and progress beam refinement sufficiently through (subsequent) BRRS, and in this case, CSI-RS #2 may be QCL configured/indicated with BRRS, not BRS.

And/or, in the case that a plurality of CSI-RS resources is configured to a receiver (or a UE), QCL assumption may be configured/indicated between a plurality of CSI-RS resources (for at least reception beam related parameters). For example, in the case that CSI-RS #1 and #2 are set to a UE, the UE may assume the QCL relation between antenna ports of CSI-RS #1 and #2 (at least reception beam related parameters).

And/or, a receiver (or a UE) may be configured/indicated with QCL assumption between antenna ports in a single CSI-RS resource. For example, in the case that CSI-RS #1 is set to a UE, the UE may assume the QCL relation between antenna ports corresponding to CSI-RS #1.

In order to support such various operations smoothly, QCL assumption with either one of BRS or BRRS may be selectively configured/indicated to a CSI-RS. However, the present invention is not limited thereto, but according to an embodiment, QCL assumption for both of BRS and BRRS may be configured/indicated to a CSI-RS, and a method of maximizing QCL RS density may also be supported together.

When an eNB indicates RS/SS (e.g., specific BRS port(s)) information QCLed for a specific CSI-RS to a UE (dynamically), the eNB may restrict QCL parameter/property to which QCL assumption is applied to a part of the numerated QCL parameters/properties.

For example, a UE may be restricted such that QCL assumption is available only for {Doppler spread, and/or Doppler shift} parameter/property. This is caused by the reason such as the case that there is a limitation in obtaining frequency synchronization only with the CSI-RS safely.

And/or, a UE may be restricted that QCL assumption is (also) available for {Average angle and/or Angular spread} parameter/property. This is because it is beneficial to reflect more stable beam with to CSI-RS reception process. Furthermore, when a beam width of CSI-RS is narrow, it may be set to a UE such that only "AS" is reflected (i.e., QCL assumption) (additionally).

And/or, a UE may be restricted that QCL assumption is (also) available for {Delay spread, and/or Average delay} parameter/property. This is because it is beneficial to reflect the QCL parameter such as BRS transmitted with wider band than CSI-RS transmission bandwidth to the CSI-RS reception process, considering the case that CSI-RS is transmitted with CSI-RS transmission bandwidth which is limited to a part of band.

5. DMRS QCL

When a UE is trying to receive DMRS-based PDSCH/EPDCCH, and the like, the channel estimation for DMRS is required, QCL assumption/signaling with a specific CSI-RS, BRRS, and/or BRS may be supported for such DMRS.

For example, in the environment that it is determined that CSI-RS density is sufficient (by an eNB), it may be configured/indicated that only QCL between DMRS and specific CSI-RS resource(s) is applied. Alternatively, when it is considered that CSI-RS transmission has aperiodic property and CSI-RS density is insufficient like NR environment, DMRS may be supported with QCL of other RS in which RS density is stably guaranteed in comparison with CSI-RS. In this case, DMRS may be QCLed with specific BRS, BRRS and/or PCRS, and direct QCL signaling indicating such QCL configuration may be supported in a UE. At this time, the direct QCL signaling may be indicated to a UE even for specific CSI-RS resource(s), PSS and/or SSS together/additionally as well as the RS.

When the specific QCL configuration/indication between inter-RS/SS is provided as described above, an inter-RS/SS QCL relationship may be defined/configured in the format in which QCL application is available between independent/separated/different RS and/or SS for specific/individual QCL parameter. That is, when a UE assumes/applies QCL, the UE may distinguish/change the applied QCL parameter according to RS/SS types that are QCLed with DMRS.

As an example, in the case that DMRS is QCLed with specific CSI-RS resource(s), a UE may be configured/indicated so as to assume/apply QCL limitedly only for {Delay spread, Average delay, Average angle, Angular spread, and/or Average gain} parameter/property. In addition, in the case that DMRS is QCLed with specific BRS, BRRS, PCRS, and/or PSS/SSS, a UE may be configured/indicated so as to assume/apply QCL limitedly only for {Doppler spread, and/or Doppler shift}. This is because there is a limitation in estimating/applying {Doppler spread, and/or Doppler shift} parameter/property based on CSI-RS only.

As another example, in the case that DMRS is QCLed with specific BRS(s), BRRS(s), PCRS, and/or CSI-RS resource(s), a UE may be configured/indicated so as to assume/apply QCL limitedly only for {Delay spread, Average delay, Average angle, Angular spread, and/or Average gain} parameter/property. In addition, in the case that DMRS is QCLed with specific PSS and/or SSS, a UE may be configured/indicated so as to assume/apply QCL limitedly only for {Doppler spread, and/or Doppler shift}. This embodiment is applicable to the case that it guarantees more stable performance to estimate/apply {Doppler spread, and/or Doppler shift} parameter/property from PSS/SSS.

As another example, in the case that DMRS is QCLed with specific BRS(s), BRRS(s), PCRS, and/or CSI-RS resource(s), a UE may be configured/indicated so as to assume/apply QCL limitedly only for {Delay spread, Average delay, Average angle, Angular spread, and/or Average gain} parameter/property. In addition, in the case that DMRS is QCLed with specific BRS(s), BRRS(s), PCRS, and/or PSS/SSS, a UE may be configured/indicated so as to assume/apply QCL limitedly only for {Doppler spread, and/or Doppler shift} parameter/property. According to this embodiment, in the case of specific BRS(s) and/or BRRS(s), QCL assumption is applicable for all (or most of) QCL parameters/properties, and simultaneously, in the case of specific CSI-RS resource(s), QCL assumption is applicable only for a part of limited QCL parameters/properties (e.g., except {Doppler spread, and/or Doppler shift}). As such, an eNB may differently configure/indicate applicable range of QCL parameter/property for each RS/SS, and a part of multiple RSs/SSs are configured/indicated to be QCL-assumed with the same QCL parameter/property, and accordingly available number of RS samples may be more increased. In this case, the most direct QCL application may be implemented in the form that a priority is provided to a specific RS (e.g., CSI-RS), but QCL application from other RS (e.g., BRS, BRRS, and/or PCRS) may be considered together through weighted average, and the like.

When assuming/signaling DMRS QCL (for the purpose of supporting non-coherent joint transmission, etc.), different QCL configuration/indication may be applied to each specific DMRS port(s). For example, in the case that a UE is indicated with DMRS ports 7 to 10 (through DL scheduling grant), the UE may be indicated such that the UE is available to be QCL-assumed with specific {BRS(s), BRRS(s), PCRS, and/or CSI-RS} for DMRS ports 7 and 8 among these, and available to be QCL-assumed with specific {BRS(s), BRRS(s), PCRS, and/or CSI-RS} for DMRS ports 9 and 10. This may be applied to the embodiment that DMRS ports {7 and 8} and {9 and 10} may be transmitted from different Transmission Reception Points (TRPs), or transmitted from different antenna panels even in the same TRP, as a matter of fact. Through this, (non-coherent) joint transmission of various forms may be efficiently supported.

The case may be assumed that specific DMRS is QCLed with specific CSI-RS, the corresponding CSI-RS is QCLed with specific BRS, and both of the DMRS QCL and the CSI-RS QCL are dynamically indicated by (separate) L1-level signaling (e.g., signaling by DCI). In this case, a timeline issue for the timing when the DMRS is QCL-assumed with the transmitted CSI-RS may occur. In other words, a timeline issue may occur that QCL with the CSI-RS transmitted on a certain time is applied to DMRS reception/measurement.

In order to solve it, in the case that a signaling that specific DMRS (port(s)) is QCLed with specific CSI-RS ID #k is received in #n SF:

A UE may apply QCL assumption based on measurement samples of CSI-RS ID #k received in a single SF timing (it may be limited that this embodiment may be applied only to the case that measurement restriction (MR) is set to be ON only for the corresponding CSI-RS ID #k), of the corresponding CSI-RS ID #k the most recently (successfully) received among the #n SF timing or the previous SF timings, or A UE may apply QCL assumption through combining/averaging with measurement samples of CSI-RS ID #k of provided QCLed RS/SS (e.g., BRS(s) and/or BRRS(s)) more prior timing (on which the same information was provided by QCL signaling), as well as measurement samples of CSI-RS ID #k received in a single SF timing, of the corresponding CSI-RS ID #k the most recently (successfully) received among the #n SF timing or the previous SF timings.

6. PCRS QCL

PCRS is an RS defined for the purpose of phase drift adjustment/phase tracking, and may be transmitted with DMRS. A DMRS per each DMRS port group in which a plurality of DMRS ports is included may be interlinked with a single PCRS (e.g., has QCL/GCL relationship). PCRS may also be referred as Phase Tracking (PT)-RS. Alternatively, in the case that PCRS is GCLed with DMRS in GCL aspect described below, DMRS may also be referred to as a Primary DMRS or a Secondary DMRS (or PT-RS), and PCRS may also be referred to as a Secondary DMRS or a Primary PCRS (or PT-RS).

It may be defined/configured that the QCL operation configured/indicated to apply in order to receive/measure DMRS transmitted/scheduled together may be applied to the QCL required for receiving/measuring PCRS without any change/in the same manner. In the present disclosure, such a relationship is referred to as "genuine co-location (GCL)" relationship. That is, GCL means the QCL relationship in which not only a large-scale parameter may be inferred between QCLed antenna ports, but also the more parameters (e.g., small-scale parameter, etc.) may be inferred. As a generalization, a UE may interpret that 'GCLed (or having GCL relationship) ports are treated as the same port, and available to be specific time bundling and/or frequency bundling is available'. That is, in other words, an assumption of the same precoding is available to a UE by treating the ports in the GCL relationship as the same port, actually.

For example, PCRS may be defined/configured/indicated so as to be GCL-assumed with DMRS, and in this case, a UE may treat/regard the PCRS port and the DMRS port as the same port, and assume that the same procoding is applied to two antenna ports.

Such GCL concept will be described in more detail below in relation to transmission beam coordination and QCL.

And/or, a scheme is also available that the QCL required to receive/measure PCRS is divided from the QCL of DMRS transmitted/scheduled together, and separate/independent QCL signaling is provided. At this time, separately divided QCL signaling may be provided separately for each RS through DCI. Alternatively, in order to prevent aggravating DCI overhead problem, QCL signaling for PCRS may be separated so as to be provided in semi-static scheme relatively than QCL signaling for DMRS. For example, QCL signaling for PCRS may be provided L2-level signaling through MAC CE, and so on, and/or RRC signaling, and the like. For example, DMRS may be configured/indicated such that QCL assumption is available with specific CSI-RS (and/or BRS and/or BRRS), or PCRS may be configured/indicated such that QCL assumption is available with specific (serving) BRS (and/or BRRS).

In the present disclosure, (QCLed/GCLed) (specific) RS/SS may be implicitly indicated to be RS/SS for serving-cell/TP/beam, specifically. That is, a UE may be defined/configured such that the (QCLed/GCLed) (specific) RS/SS is RS/SS for RS/SS for serving-cell/TP/beam, and apply the QCL assumption therefor.

7. QCL Type

In the case of QCL type in LTE-A standard, an eNB configures RRC with QCL type B for CoMP operation such that a UE may perform dynamic point selection (DPS) operation, and an eNB configures RRC with QCL type A for non-CoMP operation such that a UE applies QCL among all RSs in a serving cell with each other.

In NR environment, an operation of being served for a virtual cell/sector formed in a specific beam direction as well as cell/TP (e.g., by analog beamforming). When such a virtual cell/sector is commonly called "beam" for the convenience of description, it is required that inter-beam CoMP operation such as Dynamic "beam" selection is also available. A particular example for this will be described by reference to FIG. 10 below.

Figure 10:
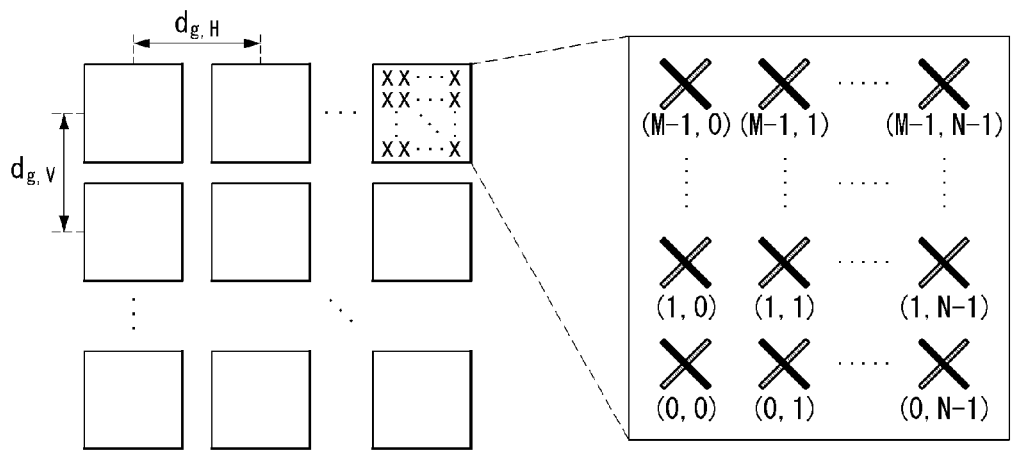
FIG. 10 illustrates an antenna panel model in which analog beamforming is applied for each panel to which the present invention may be applied.

FIG. 10 illustrates an antenna panel model in which analog beamforming is applied for each panel to which the present invention may be applied.

As shown in FIG. 10, through the transmission antenna configuration having "multi-panel antenna" structure, it may be assumed the situation that specific analog beamforming is applied to each panel, and each forms "virtual cell/sector/beam". In such a situation that a signal transmitted from a transmitter is not dominant in a particular beam direction (e.g., from a particular panel) for a specific receiver, and signal qualities of two or more beam directions show a difference within a specific level, the performance improvement may be expected through the DBS described above.

Accordingly, in the present disclosure, it is proposed that specific QCL type B' in which a receiver may support such an operation is defined/configured, and accordingly, the receiver may perform beam-based CoMP operation like DBS smoothly. In addition, QCL type A' may be supported as a mode in which QCL assumption may be applied between RSs that correspond to serving cell/TP/beam.

In summarizing the proposed contents, QCL type switching may be defined/configured in the following forms.

A UE to which transmission mode x for serving cell/TP/beam is configured (or configured for New RAT operation) may be configured with one of the following QCL types below for serving cell/TP/beam by higher layer parameter, in order to decode PDSCH according to a transmission scheme associated with antenna ports (e.g., ports 7-14) in relation to DMRS.

Type A': For a UE, the antenna ports in relation to BRS (and/or BRRS and/or PSS/SSS) of serving cell/TP/beam is QCLed with at least one of the QCL parameters/properties described above.

Type B': For a UE, the antenna ports XX-YY corresponding to CSI-RS (and/or BRS/BRRS) configuration distinguished by higher layer parameter and the antenna ports (e.g., 7-14) in relation to DMRS associated with PDSCH are QCLed with at least one of the QCL parameters/properties described above.

The scheme may be also applied that QCL type B' among the configurable QCL types is replaced by QCL type C' described below, it is limitedly defined such that semi-static switching between QCL type A' and QCL type C' only is available, or all of QCL types A' to Cl' are defined and a single type is selectively configured by RRC signaling, and the like.

Type C': For a UE, the antenna ports in relation to BRS/BRRS (and/or PCRS) of a specific beam that corresponds to BRS/BRRS configuration and the antenna ports (e.g., ports 7-14) in relation to DMRS associated with PDSCH is QCLed with at least one of the QCL parameters/properties described above.

However, it is apparent that such description in relation to QCL types A to C may be modified/defined such that the QCL related proposal element proposed in the present invention is reflected in various manners. That is, when QCL type is switching by setting A' and B' or QCL type C that indicates direction QCL with specific BRS is supported (together/additionally) in addition to QCL type A' and B', in the detailed description including the applicable QCL type/property, the technical element proposed in the present invention may be reflected/substituted and defined/modified/defined.

In the present disclosure, various RSs are referred to as BRS, BRRS, PCRS, and the like, for the convenience of description, but the application of the present invention is not limited thereto, but it is apparent that the present invention may also be applied to RS of other term having the same/similarform/function/purpose of the corresponding RS.

In addition, the control information configured/indicated in a UE/receiver may be forwarded by RRC, MAC CE, and/or DCI, and a form of signaling among signaling of such L1 and/or L2 level in which the corresponding configuration/indication is provided may be defined/configured differently/independently for each individual control information.

Transmission Beam Coordination for NR and QCL

In the NR environment, single/multi point transmission may be supported for both of DL MIMO and UL MIMO. In addition, in the NR environment, a measurement assumption for QCL assumption and antenna ports may be performed. Based on this, hereinafter, intra/inter-TRP coordination transmission in which QCL is assumed between specific RSs will be described below.

1. Intra-TRP Coordination Transmission

Various antenna panel arrangement structures have been considered in the NR environment/system. A first panel model may be distinguished as a uniform 1D/2D rectangular panel array. Since a proper CSI-RS resource/port should be configured with a UE through such antenna array, an efficient closed-loop MIMO transmission may be applied based on the CSI measurement and feedback of a UE. CSI-RS port and antenna array mapping are dependent upon eNB implementation and various mapping schemes may be existed, for example, the following schemes may be exited: (1) a CSI-RS resource per panel, (2) a plurality of CSI-RS resources per panel, and (3) CSI-RS resource mapped to a plurality of panel, is mapped.

Figure 11:
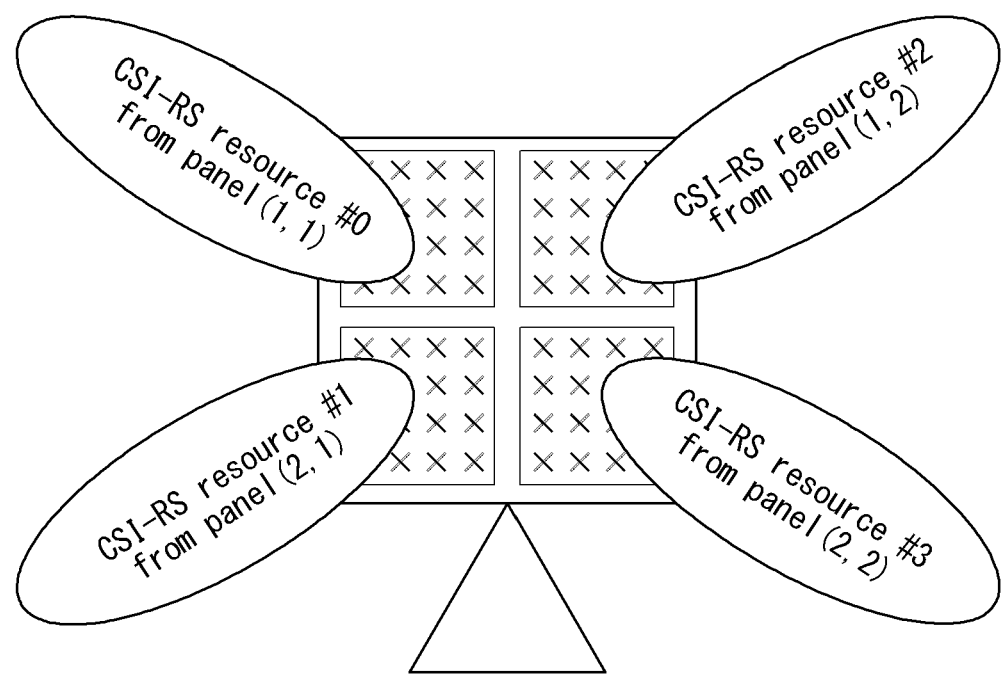
FIG. 11 illustrates a scheme in which a single CSI-RS resource is mapped per panel according to an embodiment of the present invention.

FIG. 11 illustrates a scheme in which a single CSI-RS resource is mapped per panel according to an embodiment of the present invention.

The embodiment shown in FIG. 11 shows the simplest method of CSI-RS mapping that a CSI-RS resource is transmitted in a panel and CSI-RS ports in CSI-RS resource may be QCL-guaranteed/assumed. That is, according to this embodiment, between (a part or all) CSI-RS ports in a single CSI-RS resource, the QCL may be assumed/guaranteed for at least a part (e.g., parameter in relation to average gain, delay spread, Doppler spread, Doppler shift, average delay and/or reception beam) among the QCL parameters/properties described above. Such QCL assumption/guaranteeing may be performed in the case that the same oscillator (having related component) in order to generate a signal in CSI-RS ports (included in a single CSI-RS resource or mapped to a single panel).

This may be interpreted as a single (virtual) cell operation according to the conventional art, and the single virtual cell may be associated with a UE by measuring an RS port that corresponds to Radio resource management (for the convenience of description, hereinafter, referred to as 'RRM-RS'). According to the RRM-RS and detailed RS design for potentially aperiodic/sub band CSI-RS, in order to support a UE implementation, a proper QCL assumption is required between CSI-RS resource and specific RRM-RS.

Figure 12:
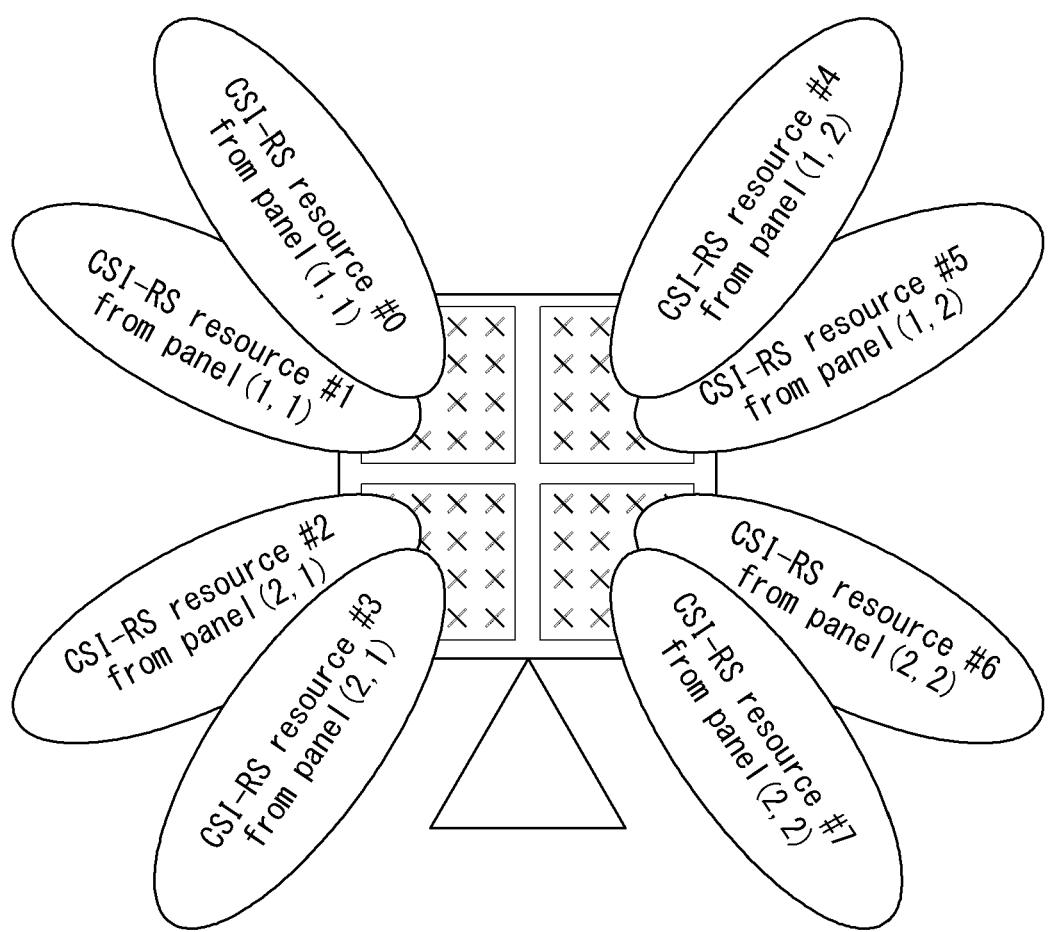
FIG. 12 illustrates a scheme in which a plurality of CSI-RS resources is mapped per panel according to an embodiment of the present invention.

FIG. 12 illustrates a scheme in which a plurality of CSI-RS resources is mapped per panel according to an embodiment of the present invention.

The embodiment shown in FIG. 12 may be interpreted as multiple beamformed CSI-RS based operation similar to Full Dimension (FD)-MIMO class B having multiple Beamformed (BF) CSI-RS resources. Since such a plurality of CSI-RSs transmitted from a single panel is oriented to different beam directions, it cannot say that each CSI-RS and the corresponding RRM-RS are in QCL always for all QCL properties/parameters. Similar to the definition in LTE specification, in the QCL assumption between CSI-RS and RRM-RS for this case, for example, only a part of properties/parameters such as Doppler shift and Doppler spread may be used, and this may be explicitly indicated. Since such a difference is caused by different CSI-RS mapping scheme for antenna array, NR specification should support various implementation schemes of CSI-RS antenna port mapping of different purposes properly.

Figure 13:
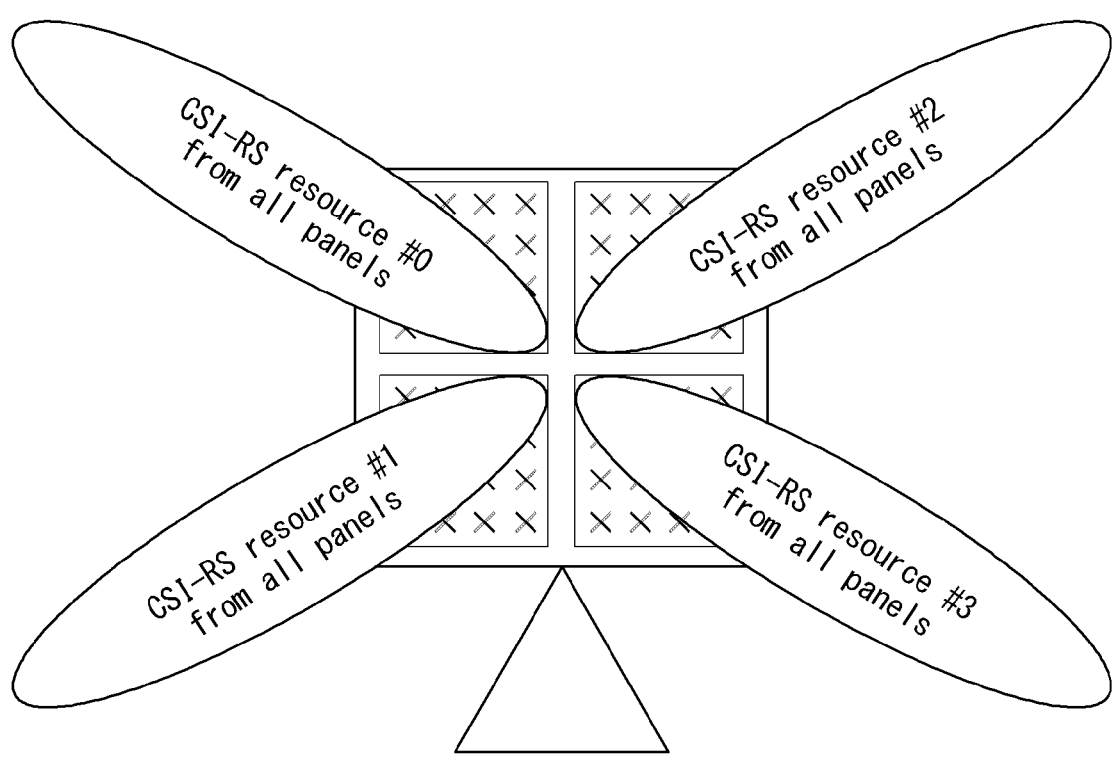
FIG. 13 illustrates a scheme in which CSI-RS resource shared by a plurality of panels is mapped according to an embodiment of the present invention.

FIG. 13 illustrates a scheme in which CSI-RS resource shared by a plurality of panels is mapped according to an embodiment of the present invention.

The embodiment shown in FIG. 13 may be interpreted as the shared CSI-RS resource which is mapped to a plurality of panels so as to have more beamforming gain in the CSI-RS transmitted by cooperative transmission from a plurality of panel antennas. Such a scheme in which CSI-RS port is mapped to a plurality of panels may be particularly useful for the case of intended to support SU-MIMO transmission for a specific UE in which traffic load is small. When it is assumed that a network obtains sufficient information of beamforming direction for a target UE, the CSI-RS may be used as a UE-specific beamformed CSI-RS dedicated to the UE. In order to properly support a use scenario, when QCL assumption is required, it is required to examine the QCL assumption between CSI-RS and RRM-RS and the way of definition or support of signaling for NR operation.

In summarizing the contents described above, according to a CSI-RS resource mapping method for multi-panel Transmission Point (TP), various intra-TRP coordination transmission scheme may be considered in NR. In addition, a proper QCL assumption between RS(s) for RRM and CSI-RS(s) set to a UE may be required to support the intra-TRP coordination transmission.

2. QCL Type and Signaling

In the case that QCL assumption between different antenna ports is required in NR in order to improve channel estimation performance, in the embodiments shown in FIGS. 11 to 13, different QCL types and similar semi-static configurations may be supported such as being defined in LTE specification (UE of TM 10 is configured with QCL type A or B by RRC signaling).

However, in the NR context, together with the CSI-RS transmission (vigorously discussed in Rel-14 eFD-MIMO) of aperiodic type which has been considered, in order to use efficiently in a reception operation in UE side, it is preferable to research the QCL type which is configurable more dynamically and the corresponding QCL assumption. In other words, each UE may be configured with specific CSI-RS resource(s) that has a few essential RRC parameters, but actual CSI-RS transmission may be controlled by an eNB through L1-signaling. Here, the controllable component may include actual transmission instance, time/frequency RE pattern, number of ports, applied port numbering and/or scrambling seed. Such a dynamic CSI-RS allocation and transmission may require support of more flexible QCL signaling with other RS that includes RRM-RS in more dynamic scheme. That is, dynamic CSI-RS allocation and transmission for NR may require more flexible QCL signaling support for other RS that includes RRM-RS.

3. Other QCL parameter/property

In current LTE specification, five LSPs for QCL between antenna ports, that is, delay spread, Doppler spread, Doppler shift, average gain, and average delay are defined. Except such existing QCL parameters, especially when analog beamforming is applied in UE side, it may be required to consider a property of a new type of arrival angle/beam for NR research.

During beam scanning/tracking procedure, a UE may select several TX-RX analog beam pair by measuring and comparing a quality of specific DL RS (for the convenience of description, referred to as 'RRM-RS'). An eNB (or may be referred to as gNB) may select one of UE-preferred transmission (TX) beams in order to transmit beamformed CSI-RS or DMRS ports. In this case, the UE should know which reception (RX) beam receives these antenna ports among candidate RX beams such that the TX beam ID corresponding to RRM-RS port is to be signaled to the UE. In this situation, it can be said that the RRM-RS port and the CSI-RS/DMRS port are QCLed in the aspect of dominant arrival angle according to the QCL definition as below.

In the case that the LSP of a channel through which a symbol of an antenna port is transferred is able to be implied/inferred from the channel through which a symbol of other antenna port is transmitted, it can be said that two antenna ports are QCLed.

The Dominant arrival angle may determine an RX beam formation coefficient. In addition, since an analog beam may not be dynamically changed on comparison with a digital beam, the Dominant arrival angle may be regarded as LSP relatively. Without QCL assumption, a UE should search a plurality of RX beam candidates, and this is time and frequency-consuming.

Accordingly, in the NR environment, a new type of QCL property needs to be considered for arrival angle when analog beamforming is applied in UE side, the reception beam related parameter described above may be defined as a new type of QCL parameter.

4. Transmission coordination between inter-RS QCL and TRP

In designing RRM-RS, in order to assist RRM-RS measurement, it should be considered whether a part (e.g., Doppler shift and average delay) of QCL parameters/properties obtained from synchronization signals is QCL-assumed for RRM-RS. When a UE tracks such RRM-RS(s) once, this may be used for QCL linkage of the second level of RRM-RS for minuter beam refinement which may be UE-specifically beamformed for the UE. As described above, it is required to be indicated that CSI-RS follows QCL linkage for primary or secondary RRM-RS(s). When sub band CSI-RS is set to a UE, for example, it may be beneficial to follow QCL for other CSI-RS which is transmitted in broadband.

In the current LTE specification, a UE to which TM10 having QCL type B is configured may be scheduled to receive a PDSCH transmitted from a non-serving cell/TP as CoMP Dynamic point selection (DPS) operation. At this time, the DMRS for a PDSCH may be instructed to follow at least one of CSI-RSs configured by PQI filed in a DCI and QCL. In other words, the DMRS for a PDSCH may be configured to have QCL relation with at least one of CSI-RSs indicated by PQI field. In such a DPS operation, in the fact that an actual dynamic TRP selection is performed according to a configured CSI-RS resource (e.g., each CSI-RS resource configured for each TRP) or a dynamic beam selection (DBS) is performed in a single TRP, a similar operation to the DPS operation may be considered in NR-MIMO. This may be interpreted as intra-TRP CoMP in beam coordination aspect.

In order to properly support these kinds of various transmission strategies in NR, the DMRS for PDSCH should also be explicitly indicated to follow QCL to other RS, e.g., CSI-RS or RRM-RS, unless DMRS design for NR study is done without requiring any other QCL supports and by guaranteeing sufficient RS density within the scheduled band.

Particularly, in order to support phase compensation at UE side owing to phase noise effect, the second level of DMRS (i.e., secondary DMRS) may be transmitted to a scheduled PDSCH which is wanted to be distributed throughout a time domain like several symbols of the same subcarrier. Since such secondary DMRS is an RS transmitted to support the phase compensation at UE side, the secondary DMRS may be the concept corresponding to the PCRS (or PT-RS) described above. Accordingly, the secondary DMRS may be referred to as the PCRS (or PT-RS) or substituted by the PCRS (or PT-RS).

It may be assumed that the secondary DMRS may be QCLed with the primary DMRS for all QCL parameters/properties, and the QCL in this case may be interpreted to the GCL described above. Here, the GCL is available for time/frequency bundling between antenna ports as described above, and indicates that these are the same port efficiently. As a result, a UE may receive DMRS by assuming the same precoding between GCLed antenna ports.

In summary, the first and second DMRSs are distributed/transmitted over a plurality of symbol regions (i.e., multiple time regions, e.g., continuous time regions) in the same subcarrier region, where a GCL relationship may be indicated/configured between the first and second DMRSs. When the UE is indicated/configured with the GCL relationship of the first and second DMRSs, the UE can receive the DMRS assuming the same precoding between the first and second DMRS ports.

The GCL relationship in the embodiment described above is interpreted with DMRS (or data demodulation) aspect mainly, and may also be interpreted/described PCRS (or phase compensation) mainly. That is, in the embodiment described above, although the secondary DMRS (or PCRS/PT-RS) is used for the purpose/effect of receiving DMRS stably by increasing DMRS density, on the contrary, the primary DMRS may be used for the purpose/effect of receiving DMRS stably by increasing PCRS (or PT-RS) density.

In describing the embodiment in the above-described aspect again, the primary and secondary PCRSs (or PT-RSs) (corresponding to the primary and secondary DMRSs) may be transmitted throughout/being distributed in a plurality of symbol domains (i.e., several time domains, e.g., consecutive time domains) in the same subcarrier domain (i.e., the same frequency domain), and in this case, the GCL relationship may be indicated/configured between the primary and secondary PCRSs (or PT-RSs). When a UE is configured with the GCL relationship between the primary and secondary PCRSs (or PT-RSs), the UE may receive PCRS (or PT-RS) by assuming the same precoding in the between the primary and secondary PCRSs (or PT-RSs) ports.

In generalizing the embodiment described above, consequently, the DMRS and the PCRS (or PT-RS) having the GCL relationship may be distributed in a time domain and transmitted to a UE in the same frequency domain, and the UE may receive the DMRS and the PCRS (or PT-RS) by assuming the GCL relationship between the DMRS and the PCRS (or PT-RS) and by assuming the same precoding. At this time, the DMRS and the PCRS (or PT-RS) which are GCLed may be named according to GCL purpose (e.g., data demodulation purpose or phase compensation purpose). In the case that the DMRS and the PCRS (or PT-RS) which are GCLed may be referred to as the primary and secondary DMRSs in the case that these are in the data demodulation purpose, and may be referred to as the primary and secondary PCRSs (or PT-RSs) in the phase compensation purpose. However, the DMRS and the PCRS (or PT-RS) which are GCLed are not limited thereto, but may also be substituted by the RS (or RS name) having the same purpose/function/effect.

In conclusion, to properly support various intra/inter-TRP coordinated transmissions, DMRS QCL to CSI-RS or RRM-RS may need to be dynamically indicated, unless DMRS design for NR is done without requiring any QCL supports and by guaranteeing sufficient RS density.

It means that the GCL concept described above is available to configure/indicate specific "{frequency, time, space, and/or code}-domain bundling/aggregation", In the case of frequency-domain bundling, a transmitter (e.g., eNB) may indicate bundling to a receiver (e.g., UE) with a subcarrier level, an RB level, an RB group (e.g., RBG) level, and/or a sub band level, and the like.

In the case of time-domain bundling, a transmitter (e.g., eNB) may indicate bundling to a receiver (e.g., UE) with a symbol level, a slot level, a (mini-) subframe level, or a subframe group (e.g. TTI bundling) level, and the like.

In the case of space-domain bundling, a transmitter (e.g., eNB) may indicate bundling to a receiver (e.g., UE) with a port/beam level, and the like, and the ports/beams in this case may correspond to corresponding specific RSs and/or channels (e.g., in the case that the same precoder should be used for nominal ports/beams distinguished in a transmitter.).

In the case of code-domain bundling, a transmitter (e.g., eNB) may indicate bundling to a receiver (e.g., UE) with specific other sequences (e.g., generated by different scrambling parameters) or between other cover codes (e.g., OCC).

As such, a receiver is configured/indicated with the fact that specific (available to apply {frequency, time, space, and/or code}-domain bundling) GCL assumption is available between RSs, SSs, and/or channels, the receiver may apply the GCL assumption between RSs, SSs, and/or channels, and may improve a reception performance by {frequency, time, space, and/or code}-domain bundling. Such an operation makes it possible to configure/indicate such GCL assumption (temporarily) in a specific case for a receiver by an intension of a transmitter, although common operation is different between RSs, SSs, and/or channels, and has an advantage that various transmission flexibilities are provided and a reception performance is improved.

For example, as exemplified above, the intended operations may be different between the PCRS and the DMRS (different antenna port number may be provided) basically (e.g., the PCRS is in the phase compensation purpose, and the DMRS is in the data demodulation purpose), and in the case that configuration/indication that the GCL assumption is available is provided, the GCLed PCRS may be utilized in DMRS reception process (with the DMRS) for the data demodulation purpose, and accordingly, a reception performance may be improved.

As another example, in addition to such an operation between specific RSs, according to the GCL relationship configured/indicated by considering the relationship of "PSS/SSS/ESS (Extended Synchronization Signal) and/or BRS", PSS may be utilized as a channel estimation reference signal of SSS, and accordingly, SSS reception performance may be improved. Similarly, in the case that BRS is also configured such that the GCL assumption is available with specific PSS/SSS/ESS, it is available to improve a reception performance of the BRS through this.

In addition, the GCL assumption may be configured/indicated such that a UE may perform bundling by GCL assumption application with respect to specific different {frequency, time, space, and/or code}-domain bundling even for the same RS, SS or channel.

For example, in the case that the GCL assumption is configured/indicated for specific time instances with respect to specific CSI-RS (resource and/or port(s)), even in the case that actual each CSI-RS transmission is (1-shot) dynamically indicated by a DCI, a UE may average/combine the measurement samples between such 1-shot CSI-RS measurement throughout the GCLed (or GCL assumption is configured/indicated) time instances. In the aspect of a transmitter, with respect to the GCLed time instances, for example, this may mean that beamforming coefficients applied when applying each CSI-RS transmission should not be changed. Consequently, the precoder applied when transmitting each beamformed CSI-RS may be transmitted in receiver-transparent manner, but a transmitter may guarantee that the CSI-RS in which same precoder is maintained/applied is transmitted in the GCLed time instances. With this, there is an effect that a receiver measures and combines the GCLed (aperiodic) CSI-RSs and secures adequate measurement samples, and through this, specific LSPs may be estimated. With the LSP estimated as such, the QCL configuration/indication described above is available with another RS (e.g., DMRS), and through this, the data demodulation performance based on DMRS may be improved.

As described above, GCL indicator (e.g., GCL indication field defined in DCI) that configures/indicates GCL may be configured with 1-bit field, and the like, and may be implemented with a "toggling" form. That is, for example, in the case that a GCL indicator transmitted while aperiodic CSI-RS transmission is triggered is '0' and a GCL indicator of CSI-RS transmission (of the same ID as the corresponding CSI-RS) transmitted/measured the most recently is also 'O' (i.e., a GCL indicator is not toggled), a UE may apply the GCL assumption between these two CSI-RS transmission, and may perform bundling/combining/averaging operation. In such a way, in the case that the UE also transmits a GCL indicator for a subsequent CSI-RS in a form of not toggled, the UE may perform bundling for the subsequent CSI-RS continually. In the case that a GCL indicator for the subsequent CSI-RS is transmitted with being toggled, the UE may not perform bundling for the corresponding CSI-RS any more.

As such, the operation that a UE determines whether to perform/apply bundling according to a GCL indicator value (e.g., whether to toggle) indicated for the most recently transmitted CSI-RS may be limited to the scheme that it is determined whether to apply the GCL assumption by comparing (by toggling) with the most recent instance in the set in which only the CSI-RS instances indicated by the same QCL as the QCL with other RS (e.g., BRS and/or BRRS) of the corresponding CSI-RS (even in the case of the same CSI-RS ID). This is because a CSI-RS transmission QCLed with other RS (e.g., BRS and/or BRRS) may be flexibly transmitted aperiodically as described above, even in the case of the transmission by the same CSI-RS ID. Consequently, as such, a UE may be limited to the scheme that the QCL assumption is applied within the CSI-RS transmission instances that follow the same 'CSI-RS to other RS (e.g., BRS and/or BRRS) QCL'.

Such a limited operation may be signaling-indicated to a UE in various manner such as bundling is applied by collecting the CSI-RS transmission instances of which CSI process ID indicated by the corresponding DCI field are the same in the case that DCI field is configured in the following forms, in addition to the method that bundling is applied by colleting the CSI-RS transmission instances of which 'CSI-RS to other RS (e.g., BRS and/or BRRS) QCL' are the same. In addition, as represented in the following Table, the way of determining the limited set may be implemented with various embodiments by the DCI field which is applied.

TABLE 4

5.3.3.1.3 Format B1
DCI format B1 is used in scheduling of xPDSCH
The information below is transmitted through DCI format B1
in subframe n
. . .
CSI/BSI/BRI request - 3bits
If an indicated value is '000', CSI/BSI/BRI is not requested.
If an indicated value is '001', this DCI format triggers BSI reporting.
If an indicated value is '010', this DCI format allocates BRRS, and triggers corresponding BRI report.
If an indicated value is '011', this DCI format allocates BRRS, but does not trigger BRI report.
If an indicated value is '100', this DCI format allocates CSI-RS, and triggers corresponding BRI report.
'101', '110' and '111' are reserved.
. . .
If this format allocates either one of CSI-RS or BRRS transmission, process indicator - 2bits
00: {Process #0}, 01 : {Process #1}, 10 : {Process #2}, 11 : {Process #3}
. . .

Only part of examples are described in the present disclosure, but the GCL relation operation may be applied by substituting QCL by GCL (and the related definition/attribute) even for all QCL related proposed operations described in the present invention (since the GCL concept is applying more fortified properties than the QCL).

SS Related QCL Definition/Concept

PSS, SSS, and/or PBCH may be transmitted within 'SS block (SSB)'. In excluding another signal, another signal is not excluded in the SS block. One or a plurality of SS block(s) may constitute an 'SS burst'. One or a plurality of SS burst(s) may constitute an 'SS burst set'. The number of SS bursts in the SS burst set may be finite. Hereinafter, how to configure the SS blocks and the SS bursts will be described in more detail.

In the NR, PSS, SSS, and/or PBCH may be defined for delivering initial access related information (e.g., symbol timing, cell-ID, required system information, and/or information for initial UL transmission, etc.). Furthermore, further discussion is underway in the NR to define other new signals/channels for required system information delivery or cell/TRP/beam measurements. Thus, several signals/channels (e.g., NR-SS, NR-PBCH, control channel, measurement RS, etc.) for initial access may be defined in the NR. In this case, the signals/channels configured/composed in the SS block may be changed according to a transmission occasion if a periodicity of each signal/channel for the initial access is different. That is, another set of initial access related signals/channels may be configured/composed within the SS block. In this regard, various types of SS blocks may be defined as follows according to a kind of configured/composed signal/channel in the SS block:

Type 1: NR-SS (PSS and SSS)
Type 2: NR-SS and NR-PBCH
Type 3: NR-SS and MRS
Type 4: NR-SS and control channel The signal/channel may be multiplexed in the SS block. According to the type of signal/channel composed in the SS block, duration of the SS block may be changed. For example, in the case of TDM, the above-described Type 1 (NR-SS only) and Type 2 (multiplexing NR-SS and NR-PRBCH) may have different SS block duration. However, regardless of the type of signal/channel composed in the SS block, it may be desirable to maintain the duration of the SS block. Furthermore, considering that the duration of the 'SS burst' is determined by the duration of the 'SS block', fixed duration of the SS burst should also be considered.

Figure 14:
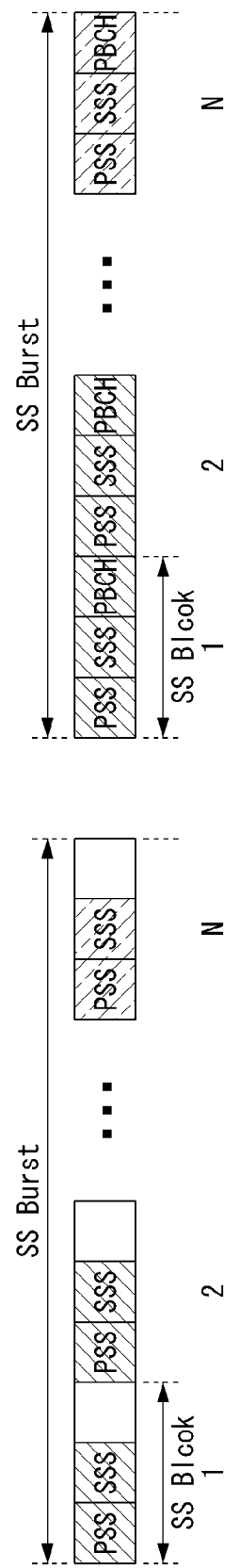
FIG. 14 is a diagram illustrating duration of an SS block and an SS burst which may be applied to the present invention.

FIG. 14 is a diagram illustrating duration of an SS block and an SS burst which may be applied to the present invention.

Referring to FIG. 14, considering that the duration of the 'SS burst' is determined by the duration of the 'SS block', the fixed duration of the SS burst may be preferred regardless of the type of composed signal/channel in the SS block. Therefore, it may be assumed that each type of SS block has the same duration regardless of all kinds of composed signals/channels in the SS block.

DL control signaling may be located in a first OFDM symbol(s) of a slot and/or minislot. Further, a UL control channel may be located in the vicinity of UL symbol(s) last transmitted in the slot. Therefore, it can be seen that a DL control channel and a DMRS are located in first N OFDM symbols and the UL control channel is located in last N OFDM symbols in the slot. In order to avoid conflict between the 'SS block' and the DL/UL control channel, the SS block may be located in the middle of the slot. Consecutive (or contiguous) SS blocks within the slot may be used to constitute the 'SS burst'. Further, when the plurality of SS blocks for the SS burst is spread across a plurality of slots, inconsecutive (or non-contiguous) 'SS blocks' may be needed to constitute the 'SS burst'.

Figure 15:
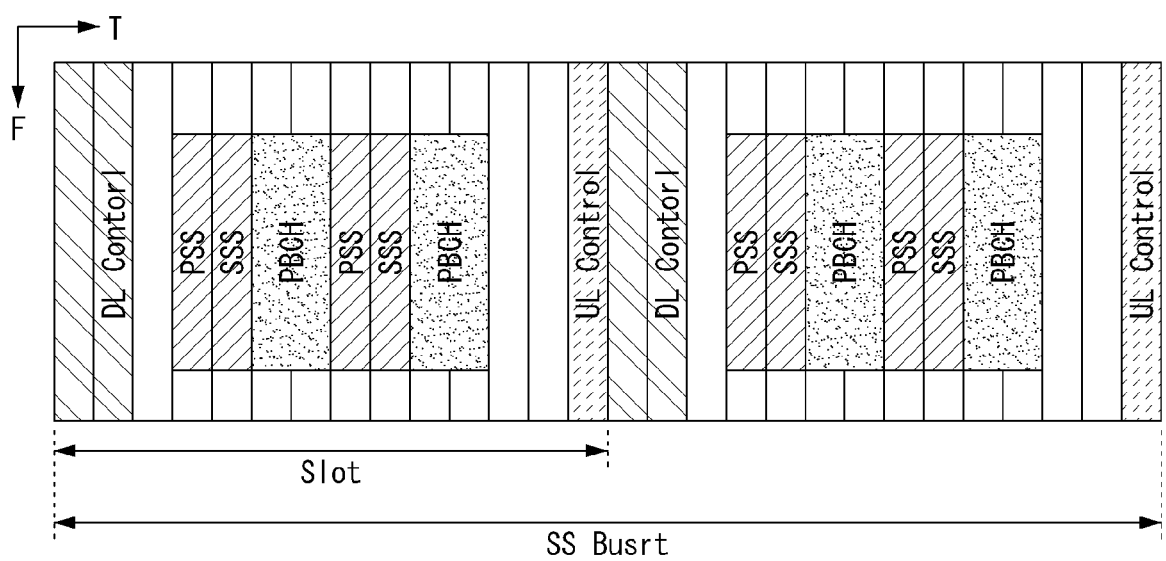
FIG. 15 is a diagram illustrating an SS burst configuration for a TDD case which may be applied to the present invention.

FIG. 15 is a diagram illustrating an SS burst configuration for a TDD case which may be applied to the present invention.

As described above, both the consecutive and inconsecutive 'SS blocks' need to be used to constitute the 'SS burst'. Therefore, both the consecutive 'SS blocks' and the inconsecutive 'SS blocks' may be used to constitute the 'SS burst'. In other words, the SS blocks constituting the SS burst may be located consecutively and/or located inconsecutively (in a time domain).

To sum up the above contents with respect to FIGS. 14 and 15, the following conclusion/proposal may be derived.

Considering that the duration of the 'SS burst' is determined by the duration of the 'SS block', the fixed duration of the SS burst may be preferred regardless of the type of composed signal/channel in the SS block. Therefore, it may be assumed that each type of SS block has the same duration regardless of the type of composed signals/channels in the SS block.

Both the consecutive and inconsecutive 'SS blocks' may be required to constitute the 'SS burst'. Therefore, both the consecutive and inconsecutive 'SS blocks' may be used to constitute the 'SS burst'.

Hereinafter, various techniques will be proposed, which a specific QCL parameter/characteristic acquired through reception of a synchronization procedure related signal (area/block) of the SS block or the like is applied to another RS (group) assumed/configured/indicated to establish QCL and/or partial QCL with the corresponding signal (area/block) (e.g., for beam management) to reduce reception complexity of the another RS (group) and/or enhance detection performance. Prior to various techniques, contents based on the proposed techniques will be preferentially described.

The following signal combinations may be considered for inter-cell RRM measurements for CONNECTED and IDLE.

1. Option 1: Same RS
  Option 1-1: NR-SSS and/or NR-PSS
  Option 1-2: Mobility RS (MRS)-1 (Multi-port multi-beam reference signal multiplexed in SS block)
  Option 1-3: Mobility RS (MRS)-2 (Multi-port multi-beam reference signal not multiplexed in SS block)
  Option 1-4: Mobility RS (MRS)-3 (Single/multi-port single-beam reference signal)
  Option 1-5: NR-SSS and DM-RS for PBCH, if DM-RS for PBCH is supported
2. Option 2: Not same RS
  Option 2-1: NR-SSS in an IDLE state; MRS-{1,2} in a CONNECTED state
  Option 2-2: NR-SSS in the IDLE state; NR-SSS and MRS-{1,2} in the CONNECTED state
  Option 2-3: NR-PSS and/or NR-SSS in the IDLE state; NR-PSS and/or NR-SSS in the CONNECTED state, and CSI-RS
  Option 2-4: In the CONNECTED state, the RS and MRS-{1,2,3} in the IDLE state At least the following aspects should be considered and results and analysis should be provided.
  Cell coverage of CONNECTED and IDLE
  Overhead (e.g., the number of resource elements, a bandwidth (BW) used for RS mapping, and resource usage over time) of an RS resource
  Accuracy of an RS measurement quantity
  The following effect may be considered in a multi-beam case due to IDLE mode RS option selection:
  Performance in DL/UL signal reception after RACH before RRC connection in association with associated beams acquired during a random access channel (RACH) procedure The CSI-RS supports DL Tx beam sweeping and UE Rx beam sweeping. The CSI-RS may be used in mode P1, P2, and/or P3.

The NR CSI-RS supports the following mapping structure.
  N_P CSI-RS port(s) may be mapped for each (sub) time unit. Throughout the entire (sub) time unit, the same CSI-RS antenna ports may be mapped. Here, "time unit" means n (>=1) OFDM symbols in configured/reference numerology.
  Each time unit may be divided into sub-time units. In this case, as a division method, a division method which is the same as division of TDM, IFDMA, and OFDM symbol-level having an OFDM symbol length (i.e., a larger subcarrier interval) which is equal to or smaller than a standard/preset/reference OFDM symbol length (subcarrier interval) may be used, but another division method is not also excluded.
  The/aforementioned mapping structure may be used for supporting multi-panels/TX chains.
  CSI-RS mapping options for Tx and Rx beam sweeping may be described below:
  Option 1: Tx beams may be the same as each other over the sub time unit within each time unit, but may be different over the time unit.
  Option 2: Tx beams may be different for each sub time unit within each time unit, but may be the same as each other over the time unit.
  Option 3 (Combination of Option 1 and Option 2): The Tx beam(s) are the same over the sub time unit within onetime unit. The Tx beam(s) may be different over the sub time unit within different time units. Only Tx sweeping or Rx sweeping may be available.

Hereinafter, for convenience of description, a CSI-RS (whose RS name may be changed) that may be configured as a (sub) time unit type for a specific beam management purpose or the like will be referred to as a Type 2 CSI-RS and a CSI-RS which may be configured as another type (e.g., a CSI-RS type of 3GPP LTE/LTE-A) will be referred to as a Type 1 CSI-RS, and each type of CSI-RS will be described below with reference to FIGS. 16A and 16B.

Figure 16A:
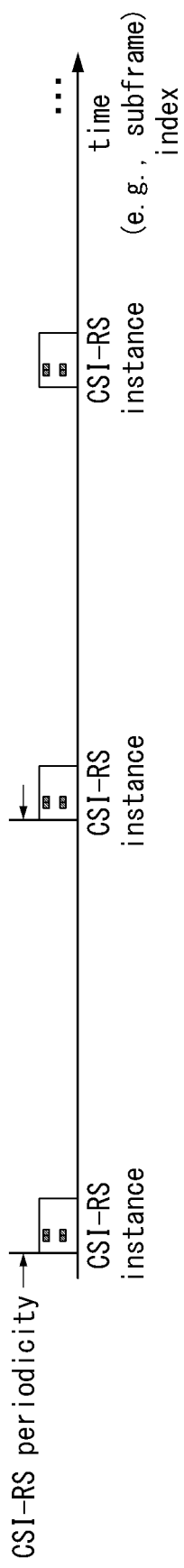
FIGS. 16A and 16B illustrate a type 1 CSI-RS and a type 2 CSI-RS which may be applied to the present invention.
Figure 16B:
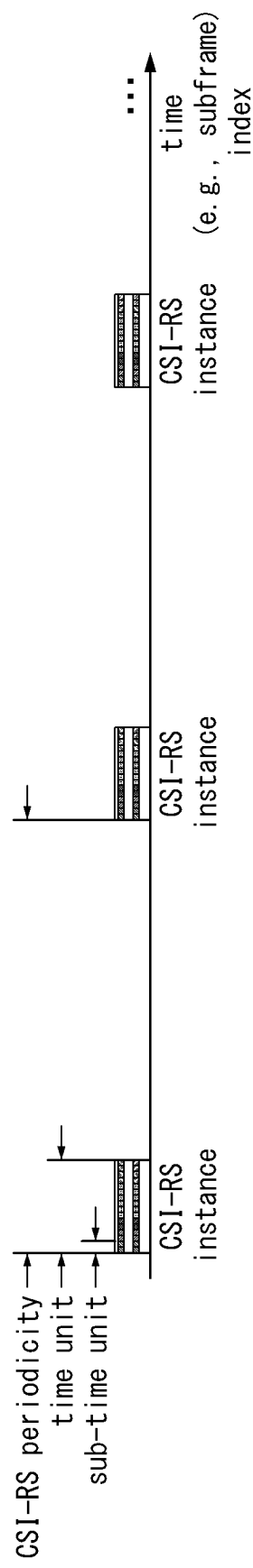

FIGS. 16A and 16B illustrates a type 1 CSI-RS and a type 2 CSI-RS which may be applied to the present invention. In particular, FIG. 16A and FIG. 16B illustrate the Type 1 CSI-RS and the Type 2 CSI-RS, respectively.

Referring to FIG. 16A, in the case of the existing CSI-RS configuration scheme (i.e., type 1 CSI-RS configuration scheme), the CSI-RS port number and/or the sequence generation/scrambling parameter may be set and a specific/period/offset may be set (may be omitted in the case of aperiodic CSI-RS, etc.). Further, the case of the existing CSI-RS configuration scheme (i.e., type 1 CSI-RS configuration scheme) follows a structure in which a location (e.g., CSI-RS RE location/pattern) of a frequency/time resource in which the CSI-RS is transmitted at each CSI-RS transmission instance is set in advance (RRC signaling). For convenience, this is referred to as Type 1 CSI-RS as described above.

Unlike this, a specific CSI-RS resource configuration may be further subdivided by a "(sub) time unit" related configuration and a detailed operation option for an operation of a UE, etc. may be further configured with respect to the corresponding (sub) time unit. For convenience, this is referred to as Type 2 CSI-RS as described above.

Referring to FIG. 16B, even in the Type 2 CSI-RS, the period/offset parameter may be configured like the Type 1 CSI-RS (or a scheme in which a period parameter is implicitly indicated/set through a point where the period/offset parameter is omitted and every time unit is represented/indicated is also available and for example, the CSI-RS may be configured/limited in a type in which multiple time units are consecutively (or contiguously) represented to be bursty, and this is associated with an aperiodic CSI-RS configuration and a start time of the corresponding CSI-RS burst, etc. may be indicated) and in this case, an additional (time unit offset) parameter explicitly indicating a CSI-RS detailed transmission time depending on the (sub) time unit may be together configured based on every CSI-RS transmission time indicated by the corresponding period/offset parameter. In addition/alternatively, every CSI-RS transmission time may be defined/set/limited to the start time of each time unit (as a default setting method) (for example, as illustrated in FIG. 16B) and a plurality of sub time units may be configured within one time unit. That is, one time unit may be divided into the plurality of sub time units. The sub time unit may be limited to be continuously configured to be only consecutive (e.g., as illustrated in FIG. 16B). Alternatively, parameters associated with a separate period/offset may be together configured with the separate period/offset so that each of the sub time units is more flexibly configured within one time unit (even inconsecutively/independently/separately).

Figure 17:
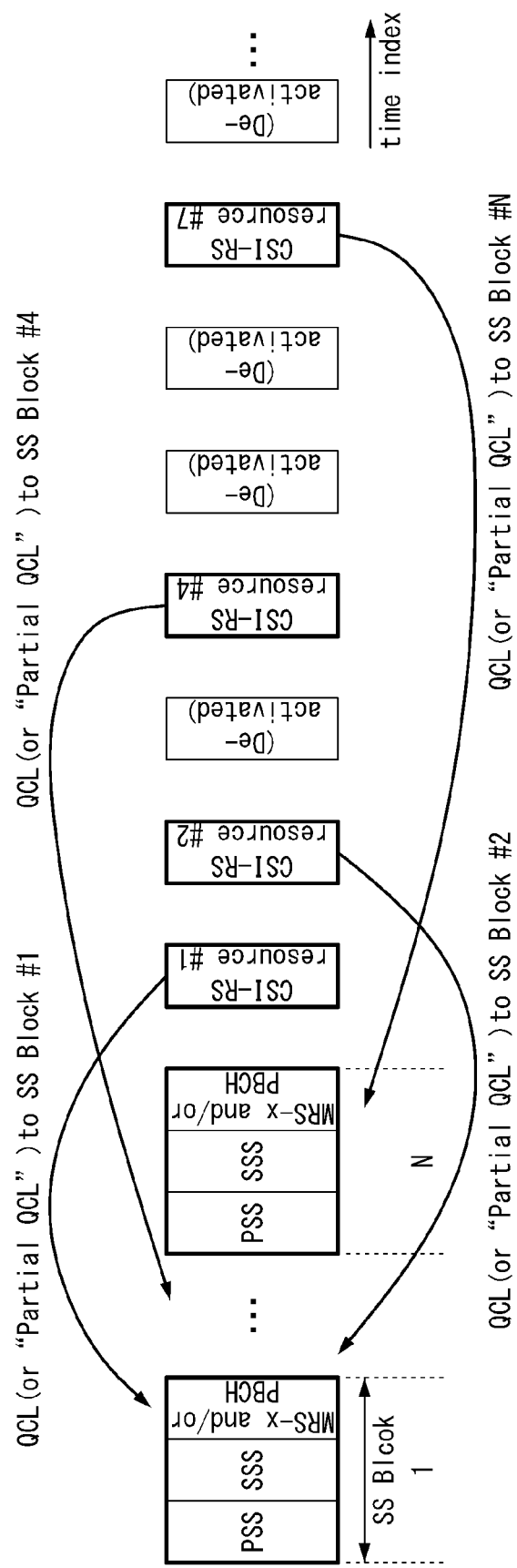
FIG. 17 is a diagram illustrating a QCL assumption scheme depending on a type 2 CSI-RS configuration according to an embodiment of the present invention.

FIG. 17 is a diagram illustrating a QCL assumption scheme depending on a type 2 CSI-RS configuration according to an embodiment of the present invention.

A configuration of a type 2 CSI-RS type may be used for a purpose for specific (DL) beam management. For example, one type 2 CSI-RS configuration may be provided in a type to include/indicate/configure one or multiple CSI-RS resource(s) and when one type 2 CSI-RS configuration includes a configuration of multiple CSI-RS resources, it may be characterfully limited that different CSI-RS resources are not transmitted at the same time. That is, it may be limited that multiple CSI-RS resources are at least TDM and transmitted (based on each resource unit) (as illustrated in FIG. 17).

Due to an advantage of such an operation, at least different/independent (analog) beams are applied among different CSI-RS resources and CSI-RS resources to which different (analog) beams are applied are transmitted to the UE at different times, and as a result, the UE may effectively perform a beam management procedure including an RX beam sweeping operation therefor. Additionally, different/independent antenna port numbers may be set for each CSI-RS resource. Alternatively, only the same antenna port number may be limited to be set for each of all different CSI-RS resources (according to a configuration of the eNB) under a specific condition.

In such a structure, another RS/signal(s) (group(s)) and/or specific SS block index (or ID)(s) (including specific MRS-1, 2, and/or 3) which assumes/establishes QCL or partial QCL with respect to specific QCL parameter(s)/characteristic(s) (e.g., at least one of Delay spread, Doppler spread, Doppler shift, Average gain, Average delay, Average angle (AA), Angular spread (AS), and/or PAP) may be configured in the UE (in advance) 'for each CSI-RS resource'. This may be configured in the UE through RRC signaling, MAC (L2) signaling, and/or DCI (L1) signaling. Accordingly, the UE may reduce implementation complexity and/or enhance detection/measurement performance by positively applying/utilizing specific QCL parameter(s)/characteristic(s) acquired through the QCL or partial QCL when measuring the antenna ports within the CSI-RS resource. Hereinafter, for convenience of description, other RS/signal(s) (group(s)) (including specific MRS-1, 2, and/or 3) and/or specific SS block index(s) which is QCL assumed or partial QCL assumed with the CSI-RS (target RS) may be collectively referred to as a 'source RS (or QCL source/reference RS)'. Therefore, a QCL parameter (or LSP) of the target RS may be implicated/estimated from a QCL parameter (or LSP) estimated from the source RS.

In addition/alternatively, when there is a plurality of other RS/signal(s) (group(s)) (including specific MRS-1, 2, and/or 3) and/or specific SS block index(s) (i.e., 'source RS') which is QCL (or partial QCL) indicated for each CSI-RS resource, the UE may be defined/configured to apply/perform a (partial) QCL assumption operation by union (or averaging or particular weighted averaging) of specific QCL parameter(s)/characteristic(s) for a plurality of source RSs indicated for each resource. In addition/alternatively, MRS-x (where x is a natural number such as x=1, 2, or 3) may also define/configure QCL or partial QCL with the specific SS block index(s) with respect to the specific QCL parameter(s)/characteristic(s) in advance.

Alternatively, in order to support more flexible eNB implementation, other RS/signal(s) (group(s)) ((including specific MRS-1, 2, and/or 3) and/or specific SS block index(s) which assumes/establishes QCL or partial QCL with respect to specific QCL parameter(s)/characteristic(s) 'for each CSI-RS antenna port (or specific port group)' within each CSI-RS resource may be configured in the UE (in advance) in such a structure. This may be configured in the UE through RRC signaling, MAC (L2) signaling, and/or DCI (L1) signaling. Accordingly, the UE may reduce implementation complexity and/or enhance detection/measurement performance by positively applying/utilizing specific QCL parameter(s)/characteristic(s) acquired through the QCL or partial QCL when measuring the antenna ports within the CSI-RS resource.

In addition, when both the former CSI-RS resource-level QCL configuring/signaling scheme and the latter port-level QCL configuring/signaling scheme are supportable, the eNB may utilize additional flexibility regarding whether to provide QCL configuration/signaling for each CSI-RS resource as in the former embodiment or whether to provide the QCL configuration/signaling for each port-level as in the latter embodiment. That is, in the embodiment of FIG. 17, the QCL or partial QCL may be transformed/applied to a type configured/indicated not by the resource unit but by each port unit in the resource. In addition/alternatively, when there is a plurality of other RS/signal(s) (group(s)) (including specific MRS-1, 2, and/or 3) and/or specific SS block index(s) (i.e., 'source RS') which is QCL (or partial QCL) indicated for each CSI-RS port, the UE may be defined/configured to apply/perform a (partial) QCL assumption operation by union (or averaging or particular weighted averaging) of specific QCL parameter(s)/characteristic(s) for a plurality of source RSs indicated for each resource. In addition/alternatively, MRS-x (where x is a natural number such as x=1, 2, or 3) may also define/configure QCL or partial QCL with the specific SS block index(s) with respect to the specific QCL parameter(s)/characteristic(s) in advance.

Meanwhile, for the purpose of the beam management, the UE may be defined/configured to perform a report associated with the beam management purpose to the eNB. In this case, when the UE reports to abase station (e.g., gNB) index information of a p-th (e.g., p=1, 2, . . . P (settable by the eNB)) preferred (CSI-RS) port, information regarding within CSI-RS resource the corresponding port is a port may also be continuously (or according to the configuration of the eNB) reported to the eNB in a type paired with the port index information. For example, when an indicator indicating which CSI-RS resource the corresponding CSI-RS resource is referred to as a CSI-RS resource indicator (CSI), reporting contents of the UE may be reported to the ENB in a type in which two indication information is paired like (CRI, port index). In addition/alternatively, simultaneously, the UE may be configured to report a specific metric (e.g., RSRP, reference signal received quality (RSRQ), and/or CQI or a specific function similar thereto) which may represent/indicate a signal quality for the port.

As another modified embodiment of the reporting contents, the paired information may be defined/configured to be configured in a type of {CRI, port selection codebook index (or PMI)} to be reported by the UE. In this case, in order to derive the port selection PMI, a "selection codebook: corresponding thereto may be pre-defined/configured. A size of a vector corresponding to each index of the selection codebook coincides with the number of CSI-RS ports in the CSI-RS resource indicated by the corresponding/paired CRI and the vector corresponding to each index may be configured in such a type (i.e., a selection codebook vector type) in which a value of only one specific element is 1 and all remaining elements are 0.

As described above, when one type 2 CSI-RS configuration is configured/provided in a type including one or K (K>1) CSI-RS resource(s), an upper limit value for a settable K value may exist. Information regarding a (maximum) K value that may be supported/implemented by the UE may be delivered to the eNB through UE specific capability signaling during initial access and based thereon, the eNB may be limited to provide up to K CSI-Resources within one Type 2 CSI-RS configuration. The eNB may configure K CSI-RS resources semi-statically in an RRC signaling form at the time of configuring one type 2 CSI-RS based on such UE capability signaling information, etc. More specifically, a configuration/control operation may be supported in which only N (N<=K) CSI-RS resources are selectively activated through L2 (e.g., by MAC CE) signaling (and/or L1 (e.g., by DCI) and L3 signaling) among K CSI-RS resources which are RRC-configured (see FIG. 17). In this case, the UE may recognize that the remaining (K-N) CSI-RS resources that are not activated are deactivated or terminated or separate signaling for deactivation/termination may be provided/supported to the UE. As a result, the UE may be defined/configured to measure the signal quality for each port configured/included in each of N activated CSI-RS resources and compare metrics acquired through the measured signal quality and report P preferred port information and/or a metric value (for each of P preferred ports) to the eNB.

A QCL definition in the NR may be determined by considering five large scale QCL parameters/characteristics such as delay spread, Doppler spread, Doppler shift, average gain, and average delay. Furthermore, in addition to the QCL parameters/characteristics, in order to support a UE side beam forming/receiving procedure, a QCL framework of the NR may be extended to new spatial QCL parameters (i.e., reception beam (Rx beam) related parameters) as described above. Such a spatial QCL parameter (i.e., reception beam related parameter) represents the QCL characteristic for a new arrival/reception angle, in particular when analog beamforming is applied to the UE side. During the beam management procedure, the UE may select several TX-RX analog beam pairs by measuring and comparing a quality of a specific DL RS (e.g., RRM-RS). The TRP may select one of the UE preferred Tx beams to transmit the beamformed CSI-RS or DMRS ports. In this case, the UE should know which Rx beam should be configured to receive the antenna ports among candidate Rx beams so that a Tx beam ID corresponding to the RRM-RS port may be signaled to the UE. In such a situation, it can be said that the RRM-RS port and the CSI-RS/DMRS port are QCL in terms of a dominant arrival/receiving angle.

The dominant arrival/receiving angle determines an Rx beamforming coefficient and may be regarded as a relatively large-scale characteristic since an analog beam may not be dynamically changed relative to a digital beam. Without the QCL assumption, the UE has to search for multiple RX beam candidates, which is energy and time consuming.

Therefore, when analog beamforming is applied in the UE, a new type of QCL characteristic (e.g., 'spatial QCL parameter (i.e., reception beam parameter)') for the dominant arrival/receiving angle should be defined in the NR.

Considering the initial access-related discussion, the RRM-RS may be referred to as MRS-1, 2, or 3 and may or may not be multiplexed within the SS block. Further, the RRM-RS may be a single or multi-beam RS. In order to support reasonable UE complexity in Rx beam search/sweeping, the CSI-RS related configuration through the RRC or MAC should at least include the QCL (or partial QCL) indication for a specific MRS-x (x is a natural number, e.g. x=1, 2, or 3) or SS block index in terms of the spatial QCL parameter. In this case, the UE may assume that the PAP from the CSI-RS is a subset of the PAP observed from the MRS-x or SS block. It is considered that the TXRU used for the CSI-RS transmission needs to be at least used for signal transmission in the SS block in an SFN manner.

Thus, in order to support the reasonable UE complexity in the Rx beam search, the CSI-RS related configuration via the RRC or MAC should include a QCL indication (at least for the spatial QCL parameter) for the SS block index. In this case, the UE may assume that the PAP from the CSI-RS is a subset of the PAP observed from the signals transmitted in the SS block.

To assist QCL association between reference signal resources/ports for UE spatial QCL parameter(s) to support the UE side beamforming/receiving procedures, UE feedback and content need to be supported.

Detailed information for the beamforming/receiving procedure should be provided, and it is desirable that performance should be assessed at least from the viewpoint of the metrics below:

RS overhead
UE feedback overhead
Spectrum efficiency

The spatial parameters for the QCL in the NR describe spatial channel characteristics of the RS antenna ports observed at a receiver. Further, in the NR, the spatial parameter describes the spatial channel characteristics of the antenna port at a transmitter. If necessary, the UE may report information related thereto to the eNB.

The NR supports or does not support a downlink indication to derive the QCL assumption to support UE-side beamforming for downlink control channel reception.

A non zero power (NZP) CSI-RS resource in the NR may be at least defined as a set of NZP CSI-RS ports that are mapped to RE sets within a frequency span/duration that may be measured to derive the CSI. Multiple NZP CSI-RS resources may be at least configured in the UE to support CoMP and a multiple beamforming CSI-RS based operation. Here, each NZP CSI-RS resource for CoMP may at least have a different number of CSI-RS ports.

Figure 18:
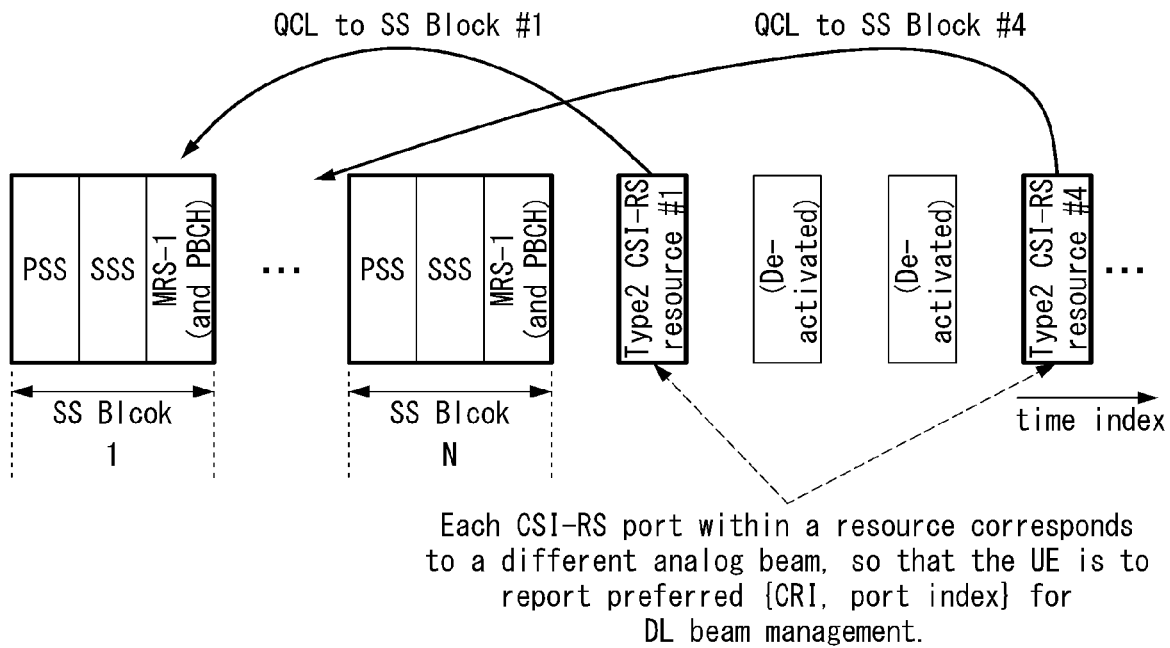
FIG. 18 is a diagram illustrating a (required) QCL indication for a type 2 CSI-RS resource according to an embodiment of the present invention.

FIG. 18 is a diagram illustrating a (required) QCL indication for a type 2 CSI-RS resource according to an embodiment of the present invention.

The QCL definition in the NR may be determined by considering five large QCL parameters/characteristics such as delay spread, Doppler spread, Doppler shift, average gain, and average delay. Furthermore, in addition to the QCL parameters/characteristics, in order to support a UE side beam forming/receiving procedure, a QCL framework of the NR may be extended to new spatial QCL parameters (i.e., reception beam related parameters) as described above. Such a spatial QCL parameter (i.e., reception beam related parameter) represents the QCL characteristic for a new arrival/reception angle, especially when analog beamforming is applied to the UE side. During the beam management procedure, the UE may select several TX-RX analog beam pairs by measuring and comparing a quality of a specific DL RS (e.g., RS port(s) for RRM, may be referred to as 'RRM-RS' for convenience). The TRP may select one of the UE preferred Tx beams to transmit the beamformed CSI-RS or DMRS ports. In this case, the UE should know which Rx beam should be configured to receive the antenna ports among candidate Rx beams so that a Tx beam direction corresponding to the RRM-RS port may be signaled to the UE through a related QCL indication. In such a situation, it can be said that the RRM-RS port and the CSI-RS/DMRS port are QCL in terms of a dominant arrival/receiving angle.

The dominant arrival/receiving angle determines the Rx beamforming coefficient and may be regarded as the relatively large-scale characteristic since the analog beam may not be dynamically changed relative to the digital beam. Without the QCL assumption, the UE has to search for multiple RX beam candidates, which is energy and time consuming.

Therefore, when analog beamforming is applied in the UE, a new type of QCL characteristic (e.g., 'spatial QCL parameter (i.e., reception beam parameter)') for the dominant arrival/receiving angle should be defined in the NR.

Considering the initial access-related discussion, the RRM-RS may be referred to as MRS-1, 2, or 3 and may or may not be multiplexed within the SS block. Further, the RRM-RS may be a single or multi-beam RS. In order to support reasonable UE complexity in Rx beam search/sweeping, the CSI-RS related configuration through the RRC or MAC should at least include the QCL (or partial QCL) indication for a specific MRX-x (x is a natural number, e.g. x=1, 2, or 3) or SS block index in terms of the spatial QCL parameter. In this case, the UE may assume that the PAP from the CSI-RS is a subset of the PAP observed from the MRS-x or SS block. It is considered that the TXRU used for the CSI-RS transmission needs to be at least used for signal transmission in the SS block in an SFN manner.

Thus, in order to support the reasonable UE complexity in the Rx beam search, the CSI-RS related configuration via the RRC or MAC should include a QCL indication (at least for the spatial QCL parameter) for the SS block index. In this case, the UE may assume that the PAP from the CSI-RS is a subset of the PAP observed from the signals transmitted in the SS block.

In regard to the CSI-RS configuration, the Type 1 CSI-RS resource (for MIMO CSI feedback) and the Type 2 CSI-RS resource (for supporting DL Tx/Rx beam sweeping) (for DL beam management) are proposed as described above.

Referring to FIG. 18, each CSI-RS resource may have a QCL assumption/relationship with a specific SS block. Further, within one CSI-RS resource, the CSI-RS ports may correspond to different analog beams. In this case, the UE may report {CRI, Port Index} preferred by the UE to the eNB for the DL beam management.

In order to measure the Type 1 CSI-RS resources for MIMO CSI feedback, the reasonable QCL signaling (e.g., QCL signaling for linking with the Type 2 CSI-RS resource and port index pair) should be at least provided to the UE in order to assist the Rx beam configuration.

That is, on the configuration of the type 1 CSI-RS resource, information indicating that the QCL or partial QCL assumption may be applied to at least one of specific type 2 CSI-RS resource(s) and/or port index (or a specific selection codebook index for the port index) within the corresponding resource(s) and QCL parameter(s)/characteristic(s) may be provided by L1 (e.g., by the DCI), L2 (e.g., by the MAC CE), and/or LE (e.g., by the RRC) signaling. The UE may reflect/apply the QCL assumption or partial QCL assumption in the Type 1 CSI-RS resource measurement based on the signaling/configuration. In this case, when information such as a specific MRS-x (e.g., x=1, 2, or 3, . . . ) and/or a specific SS block index indicated to be QCL or partial QCL for the QCL Type 2 CSI-RS resource (and/or a specific port within that resource) is present, even the information is linked/considered to be applied to measurement of the type 1 CSI-RS resource, of course. That is, the UE may consider/apply the QCL assumption/relationship between the type 2 CSI-RS resource/port and the MRS-x or SS block as well as the QCL assumption/relationship between the Type 1 CSI-RS resource and the Type 2 CSI-RS resource/port.

In this case, by a specific condition and a specific configuration, the QCL or partial QCL indication for the specific type 2 CSI-RS resource(s) and/or the port index in the corresponding resource is applied only for a purpose of a linkage indication (not for a purpose of actual QCL assumption) to limit the operation of the UE so as to apply only the QCL or partial QCL assumption for the specific MRS-x (e.g., x=1, 2, or 3, . . . ) and/or the specific SS block index QCL connected with the specific type 2 CSI-RS resource(s)

and/or the port index within the corresponding resource. Therefore, in this case, the UE may not perform the QCL assumption with the type 2 CSI-RS resource/port QCL indicated with the type 1 CSI-RS resource but perform the QCL assumption with the MRS-x and/or SS block QCL indicated with the type 2 CSI-RS resource/port at the time of measuring the type 1 CSI-RS resource.

In addition/alternatively, on the configuration of the type 1 CSI-RS resource, information indicating that the QCL or partial QCL assumption may be applied to at least one of QCL parameter(s)/characteristic(s) directly with specific MRS-x (e.g., x=1, 2, or 3, . . . ) and/or a specific SS block index may be provided by L1 (e.g., by the DCI), L2 (e.g., by the MAC CE), and/or LE (e.g., by the RRC) signaling. The UE may reflect/apply the QCL assumption or partial QCL assumption in the Type 1 CSI-RS resource measurement based on the signaling/configuration.

That is, the QCL assumption/relationship with the SSB block may be configured/indicated in the CSI-RS 'resource' unit/level as in the embodiment of FIG. 17, and as an additional/modified embodiment therefor, the QCL assumption/relationship with the SSB block may also be configured/indicated even at the CSI-RS 'port' unit/level (i.e., more precisely) within each CSI-RS resource. Thus, in the embodiments proposed in this specification, although not otherwise mentioned, embodiments described in terms of CSI-RS port unit/level may be derived as embodiments replaced with CSI-RS resource unit/level, of course and vice versa.

ports may correspond to different analog beams by gNB implementation.

Conclusions derived from the aforementioned contents may be summarized as follows:

Conclusion 1: When the analog beamforming is applied on the UE side, a new type of QCL characteristic for dominant arrival/receiving angle should be defined in the NR.

Conclusion 2: In order to support the reasonable UE complexity in the Rx beam search, the CSI-RS related configuration via the RRC or MAC should include at least a QCL indication with the SS block index for the spatial QCL parameter(s). Here, the UE may assume that the PAP from the CSI-RS is a subset of the PAP observed from the signals transmitted in the SS block.

Conclusion 3: In order to support the reasonable UE complexity in the Rx beam search, the Type 2 CSI-RS resource needs to be at least configured to form a reasonable QCL linkage with MRS-1 or SS block with respect to the spatial QCL parameter.

The QCL relationship as shown in Table 5 below may be proposed/summarized as an embodiment or an additional proposal description item according to at least one of the proposed schemes discussed above. At least one of sets x-y included in Table 5 may be defined/configured on the wireless communication system and configuration/signaling may be provided via RRC, MAC, and/or DCI for each RS/RS resource to be configured.

TABLE 5

| Type of QCL parameter set | QCL parameters | Example pairs of RSs/RS resource | Application case |
|---|---|---|---|
| Set 1-1 | {Doppler Shift, average delay, spatial QCL} | Between PSS/SSS and PBCH DMRS, within an SS block | Initial acquisition |
| Set 1-2 (FFS on spec descriptions) | {Doppler Shift, average delay} | Across SS blocks within a cell | Initial acquisition |
| Set 2-1 | {Doppler Shift, average delay} | Between an SS block(PBCH DMRS) and CSI-RS | CSI-RS measurement and F/T tracking |
| Set 2-2 | {(Partial) spatial QCL, Doppler Shift, average delay} | Between an SS block(PBCH DMRS) and CSI-RS, Between CSI-RS and CSI-RS | CSI-RS measurement (for the agreed "beam indication" case)* and F/T tracking |
| Set 3-1 | {Spatial QCL, average delay, delay spread, Doppler Spread, Doppler Shift} | Between an SS block and DMRS | Demodulation for common PDCCH and broadcast PDSCH |
| Set 3-2 | {Spatial QCL, average delay, delay spread, Doppler Spread, Doppler Shift} | Between CSI-RS(s) and DMRS | Demodulation (It is possible by agreement** that multiple CSI-RSs, each QCLed per DMRS port group, can be signaled) |

Figure 19:
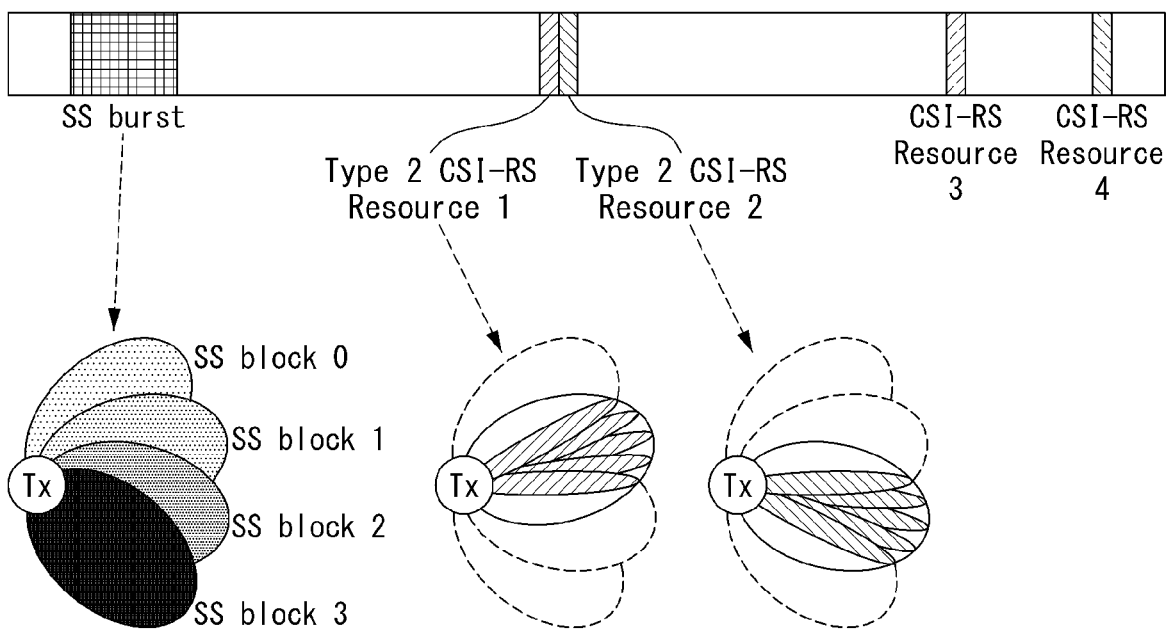
FIG. 19 is a diagram illustrating an overall DL beam management procedure according to an embodiment of the present invention.

FIG. 19 is a diagram illustrating an overall DL beam management procedure according to an embodiment of the present invention. In particular, FIG. 19 illustrates a QCL relationship between the CSI-RS resource and the SS block (or MRS-1).

Referring to FIG. 19, a beam-width of an SFN-transmitted SS block (which is QCL with the Type 2 CSI-RS resource) may be divided/segmented a plurality of transmitted CSI-RS ports within one CSI-RS resource and respective CSI-RS As shown in Table 5, a plurality of QCL parameter set types may be defined, which is a form in which a 'source RS/signal/resource (also referred to as a QCL source)' and a 'QCL parameter/type' QCL assumed with a target RS/signal/resource (e.g., CSI-RS) are jointly encoded. The eNB may indicate QCL application by selectively signaling (e.g., RRC, MAC, and/or DCI signaling) to the UE a specific type of a plurality of predefined QCL parameter set types according to an application case.

Further, Table 5 may also be interpreted as being defined as a plurality of QCL parameter set types for each grouped QCL parameter group or source RS/signal/resource (i.e., a form in which two information is not jointly encoded but the plurality of QCL parameter set types is defined only for any one information). In other words, each QCL parameter set type may be interpreted as being defined to indicate 'only specific QCL parameter group information' or 'only source RS/signal/resource information'. In this case, the eNB may indicate QCL application by signaling (e.g., RRC, MAC, and/or DCI signaling) to the UE other information excluded from joint encoding together or separately while indicating the specific QCL parameter set type. For example, the eNB may indicate to the UE QCL parameter set type 2-2 ({(Partial) spatial QCL, Doppler Shift, average delay}) and a source RS/signal/resource to be QCL applied, which corresponds thereto (e.g., signaling as a form of {DL RS ID/index, QCL parameter set type}).

As described above, in the NR, the QCL indication between antenna ports of two CSI-RS resources may be supported. Basically no QCL should be assumed between the antenna ports of two CSI-RS resources and in this case, a partial QCL parameter (e.g. only the spatial QCL parameter of the UE side) may be considered.

In the case of the DL, the NR may support CSI-RS reception with or without a beam related indication. When the beam related indication is provided, information regarding the UE side beamforming/receiving procedure used for CSI-RS based measurement may be indicated to the UE through the QCL. In this case, QCL information includes a spatial parameter for receiving the UE side CSI-RS port.

In the case of 3- and 4-layer transmission, the NR supports one codeword (CW) per UE and per PDSCH/PUSCH allocation.

DMRS port groups belonging to one CW may have different QCL assumptions. One UL- or DL-related DCI may include one MCS per CW. One CQI per CW may be calculated.

At least for a purpose of beam indication for NR unicast PDSCH, the NR may support N (N may be configured up to "3")-bit indicator bit within the DCI providing a reference to the DL RS spatially QCLed with at least one PDSCH DMRS port group.

An indicator state may be associated with an index (e.g., a CRI, SSB index) of at least one DL RS and each index of the DL RS may be associated with a given DL RS type (e.g., aperiodic CSI-RS, periodic CSI-RS, semi-persistent CSI-RS, or SSB). One possibility of DL CSI-RS type determination is using a resource setting ID, but is not limited thereto.

The NR may support a QCL indication of DM-RS for PDSCH through DCI signaling. The N-bit indicator field described above may be extended to support the following functions:

Each state may indicate one or two RS sets indicating/having the QCL relationship for each of one or two DMRS port groups.

Each RS set represents one or more RS(s) QCLed with DM-RS ports in the corresponding DM-RS group. The RSs in the RS set may be of different types.

When there one or more RSs per RS set, each of the RSs may be associated with a different QCL parameter. For example, one RS may be associated with a spatial QCL, while another RS may be associated with another QCL parameter. The RS setting for each state may be performed via higher layer signaling (e.g., RRC/RRC+MAC CE).

A method for configuring the QCL relationship between the reference RS and the target RS may be supported in the NR as follows:

When the QCL relationship is configured, at least the spatial QCL relationship may be signaled between the SS block (source/reference RS) and at least periodic (P)/semi-persistent (SP) CSI-RS (target RS).

When the QCL relationship is configured, at least the spatial QCL relationship may be signaled between a P/SP CSI-RS resource (source/reference RS) and at least another P/SP CSI-RS (target RS).

Further, in the NR, the following functions may be at least supported for at least single component carrier (CC)/bandwidth part (BWP) and single TRP:

Antenna port(s) of the NZP CSI-RS may be QCLed with the antenna port(s) of the other RS for the following parameters:

QCL with at least one of the tracking reference signal (TRS) for (average delay, delay spread, Doppler shift, and/or Doppler spread), the SS block for (spatial Rx parameter(s)), or the NZP CSI-RS for (spatial Rx parameter(s)).

The antenna port of the DM-RS may be QCLed with the SS block with respect to (average delay, delay spread, Doppler shift, Doppler spread, and/or spatial Rx parameter) for PDSCH demodulation before TRS configuration.

Antenna port(s) of the NZP CSI-RS may be QCLed with the antenna port(s) of another RS for the following parameters:

QCL with the SS block with respect to (average delay, delay spread, Doppler shift, Doppler spread, and/or spatial Rx parameter)

The antenna port of the DM-RS may be QCLed with the NZP CSI-RS with respect to (average delay, delay spread, Doppler shift, Doppler spread, and/or spatial Rx parameter). Further, the antenna port of the DM-RS may be QCLed with the TRS with respect to (average delay, delay spread, Doppler shift, Doppler spread, and/or spatial Rx parameter).

Various RS combinations with the QCL assumption may be proposed as follows, according to before or after TRS and CSI-RS RRC establishment:

1. Above and below 6 GHz, before RRC setting of TRS and CSI-RS:

SSB→DMRS (the SSB is the source RS and the DMRS for PDSCH is the target RS) for PDSCH, i.e., the DMRS for PDSCH is QCLed with the SSB with respect to (Doppler shift, Doppler spread, average delay, delay spread, and/or spatial Rx parameter (the spatial RX parameter is used only at 6 GHz or higher)).

SSB→DMRS (the SSB is the source RS and the DMRS for PDSCH is the target RS) for PDCCH, i.e., the DMRS for PDCCH is QCLed with the SSB with respect to (Doppler shift, Doppler spread, average delay, delay spread, and/or spatial Rx parameter (the spatial RX parameter is used only at 6 GHz or higher)).

2. Below 6 GHz for single TRP, after RRC setting of TRS and CSI-RS:

SSB (also available in another component carrier (CC)+TRS+CSI-RS for CSI acquisition+DMRS for PDSCH SSB→TRS (the SSB is the source RS and the TRS is the target RS): (Doppler shift and/or average delay), i.e., TRS is QCLed for the SSB with respect to (Doppler shift and/or average delay).

Further, type A and type B may be defined as follows according to the QCL scheme.

1. Type A:
   TRS (source RS)→CSI-RS (target RS) for CSI acquisition: Doppler shift, Doppler spread, average delay, and/or delay spread
   TRS/CSI-RS (source RS)→DMRS (target RS): Doppler shift, Doppler spread, average delay, and/or delay spread That is, the type A may be defined to indicate 'the CSI-RS for CSI acquisition may be QCLed with the TRS with respect to Doppler shift, Doppler spread, average delay, and/or delay spread and the DMRS may be QCLed with the DMRS with respect to Doppler shift, Doppler spread, average delay, and/or delay spread'.

2. Type B:
   TRS (source RS)→CSI-RS (target RS) for CSI acquisition: Doppler shift and/or Doppler spread
   CSI-RS (for the CSI acquisition)→DMRS: Doppler shift, Doppler spread, average delay, and/or delay spread That is, the type B may be defined to indicate 'the CSI-RS for CSI acquisition may be QCLed with the TRS with respect to Doppler shift and/or Doppler spread and the DMRS may be QCLed with the CSI-RS with respect to Doppler shift, Doppler spread, average delay, and/or delay spread'. The type B may be applied for a CoMP operation of the eNB.

A wide beam TRS may be QCLed with a narrow beam CSI-RS and the wide beam CSI-RS may be QCLed with a narrow beam DMRS.

The RS combination, which is assumed to be QCL for a case after RRC setting at 6 GHz or more, will be described below.

Meanwhile, the N-bit indicator (in particular, a signaling mechanism for linkage between the DL RS index (e.g., CRI, SSB index) and the indicator state) of the DCI described above should be based on an explicit signaling scheme similar to an LTE PQI field in which a PQI state is explicitly described by RRC signaling. Further, in order to maintain the same spatial QCL assumption between PDCCH DMRS and PDSCH DMRS, the N-bit indicator of the DCI may have a default state description on the same spatial QCL assumption.

In other words, an explicit signaling mechanism for linking the DL RS index (e.g., CRI, SSB index) with indicator state should be at least supported, and the support of the linkage may be implicitly determined by the UE.

The indicator state may include or may not include other parameters (e.g., another QCL parameter for a mapping purpose to the RE from PDSCH similar to PQI in LTE). Such a joint encoding scheme may be supported similar to LTE to maintain better trade-offs in DCI overhead and flexibility and may be achieved by appropriately expanding a value of N above [3 bits]. That is, together with the PDSCH beam indication, PDSCH rate matching information which may include a PDSCH start symbol (to provide a beam switching time interval, a DCI decoding time, and a ZP CSI-RS resource for protecting the CSI-RS of a neighboring beam) needs to be indicated. Therefore, joint encoding between the PDSCH beam indication and the PDSCH rate matching information may be supported in order to reduce the DCI overhead.

With respect to an issue that the RS set for each state may be configured via the higher layer signaling such as RRC or RRC+MAC CE, this specification proposes that the NR supports RRC+MAC CE signaling in the NR to update that each indicator state is updated by MAC CE. This may enhance efficiency and flexibility in terms of network implementation. That is, in this case, the configuration of the RS set for each state may be performed even through RRC+MAC CE as well as RRC.

In the case of a QCL application timing related with a QCL indication time, in order to change/apply the PDSCH beam according to the PDCCH indication, at least one slot latency or two symbols for a timing gap for accurately decoding the PDCCH should be permitted. That is, at least one slot latency or two symbols (latency) should be permitted for the QCL application timing related with the QCL indication time.

With respect to the indicator state, the mentioned spatial QCL relation between a reference RS and a targeted RS is an independent feature of the spatial QCL indication for PDSCH reception. Therefore, two indicators themselves may be actually separated into independent DCI fields/formats. That is, the indicator for the spatial QCL relationship between the reference RS and the target RS may be supported as a DCI field/format separated/independent from the spatial QCL indicator for PDSCH reception.

The spatial QCL relationship between the reference RS and the target RS may be proposed as follows.

Signaling for the spatial QCL relationship between the SS block (reference RS) and at least P/SP CSI-RS may be performed even through RRC+MAC CE as well as RRC, and as a result, higher efficiency and flexibility may be generated in terms of beam control. Further, the aperiodic (AP) CSI-RS may be supported to be permitted with respect to the target RS and this means that the beam indication is preconfigured by RRC+MAC CE, but an actual transmission timing of the AP CSI-RS may be indicated similar to an AP CSI-RS concept of LTE, which is introduced by eFD-MIMO.

Signaling for the spatial QCL relationship between the P/SP CSI-RS resource (reference RS) and another/different P/SP CSI-RS resource may also be performed even through RRC+MAC CE as well as RRC and this provides higher efficiency and flexibility to the beam control. Further, due to such a reason, the AP CSI-RS may be supported to be permitted with respect to the target RS.

In conclusion, the signaling for the spatial QCL relationship between the SS block (reference RS) and at least P/SP CSI-RS may be performed even through RRC+MAC CE as well as RRC and the AP CSI-RS may also be permitted as the target RS. Further, signaling for the spatial QCL relationship between the P/SP CSI-RS resource (reference RS) and another/different P/SP CSI-RS resource may also be performed even through RRC+MAC CE as well as RRC and the AP CSI-RS may also be permitted as the target RS.

The QCL parameter set and a related condition for the NZP CSI-RS QCL and the DMRS QCL may be proposed as follows.

Antenna port(s) of the NZP CSI-RS may be QCLed with the antenna port(s) of the following other RS for the following parameters:
   TRS for {average delay, delay spread, Doppler shift, and/or Doppler spread}, the SS block for {spatial Rx parameter}, or the NZP CSI-RS for {spatial Rx parameter}.
   SS block for {average delay, delay spread, Doppler shift, Doppler spread, and, spatial Rx parameter} (regardless of whether the TRS is configured)

Further, for the DMRS QCL, the following matters should be additionally supported:

The antenna port of the DM-RS may be QCLed with the NZP CSI-RS with respect to {average delay, delay spread, Doppler shift, Doppler spread, and spatial Rx parameter}.

The antenna port of the DM-RS may be QCLed with the SS block with respect to {average delay, delay spread, Doppler shift, Doppler spread, and spatial Rx parameter} for PDSCH demodulation (before NZP CSI-RS configuration).

According to the proposal for the DMRS QCL, since all available required operations are sufficiently covered in the NR, the following function/operation may no longer need to be supported.

The antenna port of the DM-RS may be QCLed with the TRS with respect to {average delay, delay spread, Doppler shift, Doppler spread, and/or spatial Rx parameter}.

Antenna port(s) of the NZP CSI-RS may be QCLed with the antenna port of the following other RS for the following QCL parameter:

SS block: The antenna port of the DM-RS may be QCLed with the NZP CSI-RS with respect to {average delay, delay spread, Doppler shift, Doppler spread, and/or spatial Rx parameter} (regardless of whether the TRS is configured). Further, the antenna port of the DM-RS may be QCLed with the SS block with respect to (average delay, delay spread, Doppler shift, Doppler spread, and/or spatial Rx parameter) for PDSCH demodulation before NZP CSI-RS configuration.

Meanwhile, in the case of Type B above 6 GHz described above, it is sufficient to add/define the spatial parameter to Type B defined in the case of below 6 GHz described above. Type B may be supported as in the LTE, and Type B in the case of above 6 GHz may be defined specifically as follows (or to indicate the following QCL operation):

TRS (source RS)→CSI-RS (target RS) for CSI acquisition: {Doppler shift and/or Doppler spread}

CSI-RS (source/reference RS)→DMRS: {Doppler shift, Doppler spread, average delay, delay spread, and/or spatial Rx parameter}

That is, the type B in the case of above 6 GHz may be defined to indicate 'the CSI-RS for CSI acquisition may be QCLed with the TRS with respect to Doppler shift and/or Doppler spread and the DMRS may be QCLed with the CSI-RS with respect to Doppler shift, Doppler spread, average delay, delay spread, and/or spatial Rx parameter'.

This means that the 'spatial Rx parameter (of the DMRS) should be QCL assumed/directed only through the CSI-RS and not the TRS, so that the spatial Rx parameter should match the proposed technique for DL beam management based on the CSI-RS. This may be further utilized to efficiently support a dynamic point/beam selection operation in the NR.

In conclusion, Type B QCL may also be supported as in the LTE, and Type B descriptions in the case of above 6 GHz should include the spatial Rx parameter to be indicated the CSI-RS rather than the TRS based on the DL beam management operation supported by the NR.

Figure 20:
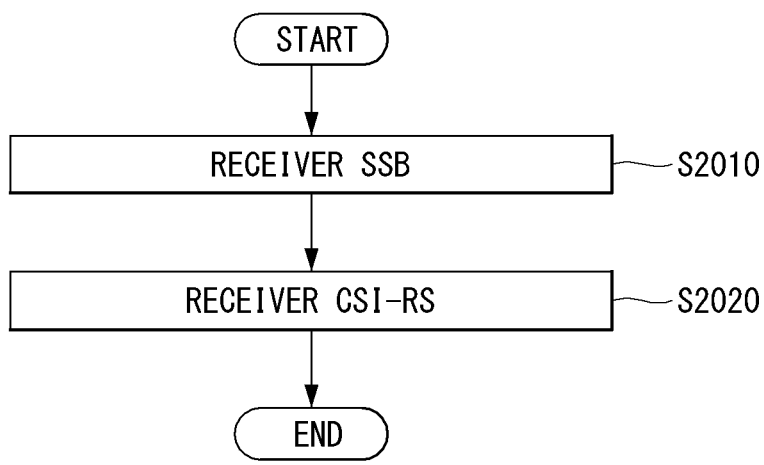
FIG. 20 is a flowchart illustrating a CSI-RS receiving method by a UE according to an embodiment of the present invention.

At this time, for the sake of network flexibility, it is possible to configure/indicate which operation/type to follow through the RRC, MAC CE, and/or DCI while defining an applicable range of the spatial Rx parameters as follows:

First embodiment) Type B in the case of above 6 GHz:
TRS (source RS)→CSI-RS (target RS) for CSI acquisition: Doppler shift, Doppler spread, average delay, and/or spatial Rx parameter CSI-RS (source/reference RS)→DMRS (target RS): Doppler shift, Doppler spread, average delay, and/or delay spread and/or Second embodiment) Type B in the case of above 6 GHz:
TRS (source RS)→CSI-RS (target RS) for CSI acquisition: Doppler shift, Doppler spread, average delay, and/or spatial Rx parameter CSI-RS (source/reference RS)→DMRS (target RS): Doppler shift, Doppler spread, average delay, delay spread, and/or spatial Rx parameter FIG. 20 is a flowchart illustrating a CSI-RS receiving method by a UE according to an embodiment of the present invention. The description of the above-described embodiments may be applied in the same or similar manner with respect to this flowchart, and duplicated description will be omitted.

First, the UE may receive an SSB (S2010). Here, the SSB may refer to a specific block including PSS, SSS, and/or PBCH. In this case, the PSS, the SSS, and/or the PBCH may be transmitted within the SSB.

Next, the UE may receive a CSI-RS associated with the SSB. In this case, the CSI-RS may correspond to a periodic CSI-RS or an aperiodic CSI-RS. Further, in this case, the CSI-RS may be a CSI-RS transmitted for a purpose of beam management, not for a purpose of CSI acquisition.

In this case, the UE may receive the CSI-RS by performing QCL assumption between the CSI-RS and the SSB. That is, the CSI-RS is QCL assumed with the SSB to be received by the UE. This may be expressed that the CSI-RS and the SSB have a QCL relationship. Alternatively, it may be expressed that the QCL relationship/assumption is established between the antenna port(s) transmitting the CSI-RS and the antenna port(s) transmitting the SSB. Alternatively, it may be expressed that the QCL relationship/assumption is established between at least one CSI-RS resource/configuration and the SSB to which the CSI-RS is mapped (or which are used for transmitting the CSI-RS).

When the CSI-RS is mapped to a plurality of CSI-RS resources, application (or activation) of the QCL assumption may be selectively indicated in units of each CSI-RS resource. The application (or activation) indication may be received by the UE through RRC signaling.

Further, when the QCL assumption with the SSB corresponds to partial QCL assumption, a QCL parameter of the CSI-RS may be assumed to correspond to a subset of the QCL parameters derived from the SSB.

Meanwhile, although not shown in the flowchart, a CSI-RS receiving method of the UE may further include receiving QCL information for indicating the QCL assumption between the CSI-RS and the SSB. In this case, the QCL information may indicate an index (or ID) of the SSB to be QCLed with the CSI-RS and a QCL type for a QCL parameter set to which the QCL assumption is applied. That is, the QCL information may include index (or ID) information of the SSB and QCL type information regarding the QCL parameter set to which the QCL assumption is to be applied. The QCL information may be received by the UE through the RRC signaling. The QCL type may be predefined to indicate different sets of QCL parameters for each QCL type and the QCL parameter set may include delay spread, Doppler spread, Doppler shift, average gain, average delay, and/or a spatial reception parameter. For example, QCL type A may be predefined to indicate a QCL parameter set including Doppler shift, average delay, and spatial QCL parameters and QCL type B may be predefined to indicate a QCL parameter set including Doppler shift and average delay parameters. Here, the spatial reception parameter may include a reception beam direction parameter and/or a reception beam width related parameter.

However, the QCL type indicated for the QCL assumption between the CSI-RS and the SSB may be pre-limited to a specific QCL type. For example, the specific QCL type may be limited/restricted to a QCL type indicating a QCL parameter set including average delay, Doppler shift, and/or spatial reception parameters. Thus, when indicating/configuring the QCL assumption between the CSI-RS and the SSB, the eNB may configure/indicate the QCL assumption in the UE only in the QCL type indicating the QCL parameter set including average delay, Doppler shift, and/or spatial reception parameters (or configured to have at least one of average delay, Doppler shift, and/or spatial reception parameters).

General device to which present invention may be applied

Figure 21:
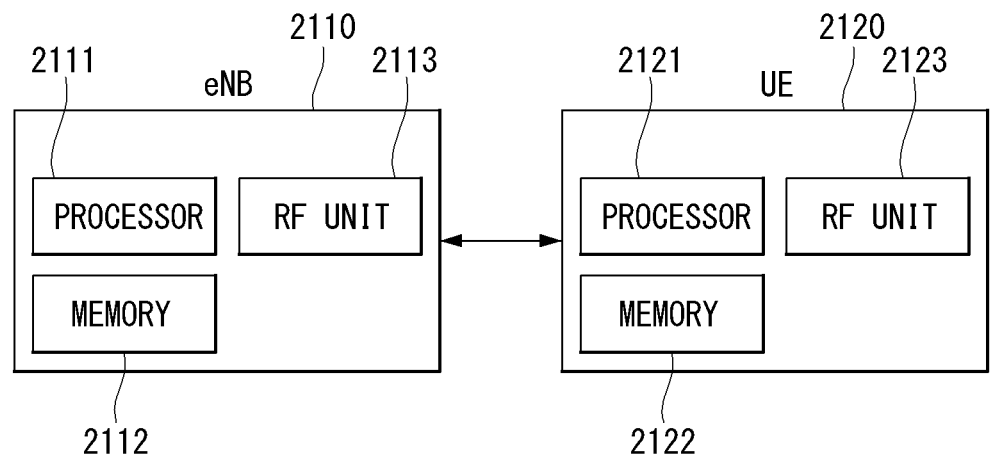
FIG. 21 illustrates a block diagram of a wireless communication apparatus according to an embodiment of the present invention.

FIG. 21 is a block diagram of a wireless communication device according to an embodiment of the present invention.

Referring to FIG. 21, a wireless communication system includes a base station (BS) (or eNB) 2110 and a plurality of terminals (or UEs) 2120 located within coverage of the BS 2110.

The eNB 2110 includes a processor 2111, a memory 2112, and a radio frequency (RF) unit 2113. The processor 2111 implements functions, processes and/or methods proposed in above-describes. Layers of radio interface protocols may be implemented by the processor 2111. The memory 2112 may be connected to the processor 2111 to store various types of information for driving the processor 2111. The RF unit 2113 may be connected to the processor 2111 to transmit and/or receive a wireless signal.

The UE 2120 includes a processor 2121, a memory 2122, and a radio frequency (RF) unit 2123. The processor 2121 implements functions, processes and/or methods proposed in above-described embodiments. Layers of radio interface protocols may be implemented by the processor 2121. The memory 2122 may be connected to the processor 2121 to store various types of information for driving the processor 2121. The RF unit 2123 may be connected to the processor 2121 to transmit and/or receive a wireless signal.

The memory 2112 or 2122 may be present within or outside of the processor 2111 or 2121 and may be connected to the processor 2111 or 2121 through various well known units. Also, the eNB 2110 and/or the UE 2120 may have a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Meanwhile, the expression of 'A and/or B' used in this specification may be construed as meaning at least one of A and B.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention applied to a 3GPP LTE/LTE-A/NR system is primarily described as an example, but may be applied to various wireless communication systems in addition to the 3GPP LTE/LTE-A/NR system.

The invention claimed is:

1. A method for receiving a channel state information (CSI)-reference signal (RS) by a user equipment (UE) in a wireless communication system, the method comprising:
receiving synchronization signal blocks (SSBs) based on a plurality of SSB indexes;
receiving CSI-RS configuration information;
receiving a CSI-RS based on the CSI-RS configuration information and the SSBs,
wherein the CSI-RS configuration information includes i) information for a plurality of CSI-RS resources and ii) QCL information for each of the plurality of CSI-RS resources,
wherein a spatial property of a beam related to transmission of the CSI-RS is independent for each of the plurality of CSI-RS resources, and
wherein based on i) the CSI-RS is related to a specific CSI-RS resource among the plurality of CSI-RS resources and ii) the QCL information related to the specific CSI-RS resource represents a specific SSB index among the plurality of SSB indexes:
the CSI-RS is assumed to be quasi co-located (QCL) with an SSB based on the specific SSB index, with respect to a spatial reception parameter.

2. The method of claim 1, wherein the SSB includes at least one of a primary synchronization signal (PSS), a secondary synchronization signal (SSS), or a physical broadcast channel (PBCH).

3. The method of claim 1, wherein the CSI-RS configuration information is received through radio resource control (RRC) signaling.

4. The method of claim 1, wherein the QCL information includes a QCL type for a QCL parameter set to which the QCL assumption is applied.

5. The method of claim 4, wherein the QCL type is defined to indicate different QCL parameter sets for each QCL type.

6. The method of claim 5, wherein the QCL parameter set includes at least one of a delay spread, a Doppler spread, a Doppler shift, an average delay or the spatial reception parameter.

7. The method of claim 1, wherein the spatial reception parameter includes at least one of a reception beam direction parameter or a reception beam width related parameter.

8. The method of claim 4, wherein the QCL type related to the QCL assumption is based on a specific QCL type.

9. The method of claim 8, wherein a QCL parameter set related to the specific QCL type includes the spatial reception parameter.

10. The method of claim 1, wherein the CSI-RS is based on a periodic CSI-RS.

11. A method for transmitting a channel state information (CSI)-reference signal (RS) by a base station in a wireless communication system, the method comprising:
- transmitting synchronization signal blocks (SSBs) based on a plurality of SSB indexes;
- transmitting CSI-RS configuration information;
- transmitting a CSI-RS based on the CSI-RS configuration information and the SSBs,
- wherein the CSI-RS configuration information includes i) information for a plurality of CSI-RS resources and ii) QCL information for each of the plurality of CSI-RS resources,
- wherein a spatial property of a beam related to transmission of the CSI-RS is independent for each of the plurality of CSI-RS resources, and
- wherein based on i) the CSI-RS is related to a specific CSI-RS resource among the plurality of CSI-RS resources and ii) the QCL information related to the specific CSI-RS resource represents a specific SSB index among the plurality of SSB indexes:
  - the CSI-RS is assumed to be quasi co-located (QCL) with an SSB based on the specific SSB index, with respect to a spatial reception parameter.

12. The method of claim 11, wherein the SSB includes at least one of a primary synchronization signal (PSS), a secondary synchronization signal (SSS), or a physical broadcast channel (PBCH).

13. The method of claim 11, wherein the CSI-RS configuration information is transmitted through radio resource control (RRC) signaling.

14. The method of claim 11, wherein the QCL information includes a QCL type for a QCL parameter set to which the QCL assumption is applied.

15. The method of claim 14, wherein the QCL type is defined to indicate different QCL parameter sets for each QCL type.

16. The method of claim 15, wherein the QCL parameter set includes at least one of a delay spread, a Doppler spread, a Doppler shift, an average delay or the spatial reception parameter.

17. The method of claim 11, wherein the spatial reception parameter includes at least one of a reception beam direction parameter or a reception beam width related parameter.

18. The method of claim 14, wherein the QCL type related to the QCL assumption is based on a specific QCL type.

19. The method of claim 11, wherein the CSI-RS is based on a periodic CSI-RS.

20. A base station for transmitting a channel state information (CSI)-reference signal (RS) in a wireless communication system, the base station comprising:
- a radio frequency (RF) unit transmitting and receiving a radio signal; and
- a processor controlling the RF unit,
- wherein the processor is configured to:
- transmit synchronization signal blocks (SSBs) based on a plurality of SSB indexes,
- transmit CSI-RS configuration information,
- transmit a CSI-RS based on the CSI-RS configuration information and the SSBs,
- wherein the CSI-RS configuration information includes i) information for a plurality of CSI-RS resources and ii) QCL information for each of the plurality of CSI-RS resources,
- wherein a spatial property of a beam related to transmission of the CSI-RS is independent for each of the plurality of CSI-RS resources, and
- wherein based on i) the CSI-RS is related to a specific CSI-RS resource among the plurality of CSI-RS resources and ii) the QCL information related to the specific CSI-RS resource represents a specific SSB index among the plurality of SSB indexes:
  - the CSI-RS is assumed to be quasi co-located (QCL) with an SSB based on the specific SSB index, with respect to a spatial reception parameter.

* * * * *